(12) United States Patent
Toyama

(10) Patent No.: US 6,796,927 B2
(45) Date of Patent: Sep. 28, 2004

(54) EXERCISE ASSISTANCE CONTROLLING METHOD AND EXERCISE ASSISTING APPARATUS

(75) Inventor: Motoki Toyama, Kobe (JP)

(73) Assignee: Konami Corporation, Tokyo (JP)

( * ) Notice: Subject to any disclaimer, the term of this patent is extended or adjusted under 35 U.S.C. 154(b) by 224 days.

(21) Appl. No.: 10/263,447

(22) Filed: Oct. 2, 2002

(65) Prior Publication Data

US 2003/0078138 A1 Apr. 24, 2003

(30) Foreign Application Priority Data

Oct. 19, 2001 (JP) .................................... 2001-321952

(51) Int. Cl.$^7$ .............................................. A63B 21/00
(52) U.S. Cl. ............................... 482/8; 482/1; 482/54; 482/900; 482/901
(58) Field of Search .......................... 482/1–9, 51, 54, 482/57, 900–903

(56) References Cited

U.S. PATENT DOCUMENTS

| | | | |
|---|---|---|---|
| 5,213,555 A | * | 5/1993 | Hood et al. .................... 482/57 |
| 5,577,981 A | * | 11/1996 | Jarvik ........................... 482/4 |
| 5,645,513 A | | 7/1997 | Haydocy et al. |
| 5,890,995 A | | 4/1999 | Bobick et al. |
| 6,024,675 A | | 2/2000 | Kashiwaguchi |
| 6,283,896 B1 | | 9/2001 | Grunfeld et al. |
| 6,336,891 B1 | * | 1/2002 | Fedrigon et al. ............... 482/8 |
| 2001/0001303 A1 | | 5/2001 | Ohsuga et al. |

FOREIGN PATENT DOCUMENTS

| | | |
|---|---|---|
| EP | 0 2 55 142 | 2/1988 |
| WO | WO 96/05766 | 2/1996 |

* cited by examiner

Primary Examiner—Glenn E. Richman
(74) Attorney, Agent, or Firm—Jordan and Hamburg LLP

(57) ABSTRACT

A running machine 1 is provided with an exercise monitoring unit 40 for turning a running belt 14 on which a user runs by means of a motor 15 and monitoring a running state of the user based on a driven state of the running belt 14. The running machine a includes a monitor 31 for displaying images at its front side. The running machine 1 is also provided with an image instructing unit 41 for displaying an image of a virtual image including a running road on the monitor 31 with the position of a virtual camera, which is changed based on the driven state of the running belt, as a viewpoint, a game executing unit 43 for displaying obstacle characters to appear on the running road in accordance with a specified rule, a direction changing unit 45 for receiving an instruction to change the running direction on the running road in response to an operation made by the user doing the running exercise, and a game evaluating unit 44 for evaluating an other athletic ability of the user based on how properly he instructed to change the running direction to avoid virtual collisions with the obstacle characters.

17 Claims, 19 Drawing Sheets

EXERCISE ASSISTANCE CONTROLLING METHOD AND EXERCISE ASSISTING APPARATUS

BACKGROUND OF THE INVENTION

1. Field of the Invention

The present invention relates to an exercise assistance controlling method and an exercise assisting apparatus for causing a user to run on an exercise machine having a driving unit and monitoring a running state of the user.

2. Description of the Related Art

A walking machine in which a running belt is drivingly turned to enable a running exercise on the upper surface thereof has been proposed as an exercise assisting apparatus (see Japanese Unexamined Patent Publication No. 2000-288144). In this machine, a monitor is provided in front of a user, and the user is caused to feel as if he were walking outdoors by reproducing real video images or computer graphic generated images stored beforehand and linking a walking speed with a reproducing speed. There have been also proposed fixed type cycling machines having a monitor at front (see Japanese Unexamined Patent Publications Nos. 7-250919, 11-137719, and 2000-5339).

A certain degree of improvement to prevent boredom resulting from the monotonousness of the conventional exercise by reproducing and displaying the real video images or computer graphic generated images on the monitor to cause the user to feel as if he were walking or running outdoors. However, a relative moving speed (i.e. reproducing speed) of objects in the displayed images uniformly changes in correspondence with the walking speed of the user. Thus, in the case that not all the displayed objects are stationary, for example, in the case that moving objects such as vehicles and other walkers are displayed, the moving speeds of the moving objects increase and decrease according to the walking speed of the user, thereby giving a feeling of incongruity. Further, the user can see background images, which change according to the exercise of the user in the fixed type cycling machine. However, this only increases an interest in the exercise to a certain extent and can accomplish merely restrictive objects such as an improvement of the cardiopulmonary function through the exercises.

SUMMARY OF THE INVENTION

In view of the above problem residing in the prior art, an object of the present invention is to provide an exercise assistance controlling method and an exercise assisting apparatus, which can evaluate a body function different from an original purpose through the exercise assistance and contribute to improving this body function.

In order to achieve the above object, according to the present invention, an exercise assisting apparatus comprises: an exercise machine having a driving unit for causing a user to do a leg exercise, exercise monitoring means for monitoring a state of the user's leg exercise based on a driven state of the driving unit, a monitor provided at the front side of the exercise machine for displaying images, display controlling means for displaying an image of a virtual space including an advancing road on the monitor with the position of a virtual camera, which is changed according to the driven state of the driving unit, as a viewpoint, game executing means for displaying a game character to appear on the advancing road in accordance with a specified rule, direction changing means for receiving an instruction to change an advancing direction on the displayed advancing road in response to an operation made by the user doing the leg exercise, and game evaluating means for evaluating another athletic ability of the user based on how properly he instructed to change the advancing direction to make a preset related operation against the game character. It should be noted that the "another athletic ability" is meant to include such as reflex and quickness, which is different from the original purpose of the exercise assistance. Furthermore, the original purpose of the exercise assistance is to improve a body function such as an improvement of the cardiopulmonary function.

With the aforementioned apparatus, when the driving unit of the exercise machine is driven and the user exercises using the driving unit, the exercise monitoring means monitors the exercising state of the user based on the driven state of the driving unit. On the other hand, the virtual space including the advancing road is displayed with a character corresponding to the user as the viewpoint of the virtual camera, and this character keeps moving forward along the advancing road by operating the direction changing means on the monitor screen. The advancing road is straight or even if it is curved, the character may automatically move forward along the running road.

The game character is displayed to appear on the advancing road in accordance with the specified rule by the game executing means. The user operates the direction changing means to make the preset related operation against this game character. For example, in such a mode assuming the game character as an obstacle, the character moves forward while avoiding the obstacle or collides with the game character if a poor operation is made. The game evaluating means evaluates the game based on the skill in instructing the preset related operation against the game character. This skill can be used to improve the level of a body function different from the original purpose of the exercise assistance such as reflex and quickness. In this way, the user can be urged to keep exercising and training for a longer time. In the case that the game executing means is operated, the advancing road used for the exercise may be used as an advancing road for the game or an advancing road separately prepared for the game may be used.

These and other objects, features and advantages of the present invention will become more apparent upon a reading of the following detailed description and accompanying drawings.

BRIEF DESCRIPTION OF THE DRAWINGS

FIGS. 15A to 15F are diagrams showing the kinds and movements of obstacle characters, wherein FIG. 15A shows a column character; FIG. 15B a wall character; FIG. 15C a trap character; FIG. 15D a spear character; FIG. 15E a rock character and FIG. 15F a sickle character.

DETAILED DESCRIPTION OF THE PREFERRED EMBODIMENTS OF THE PRESENT INVENTION

Figure 1:
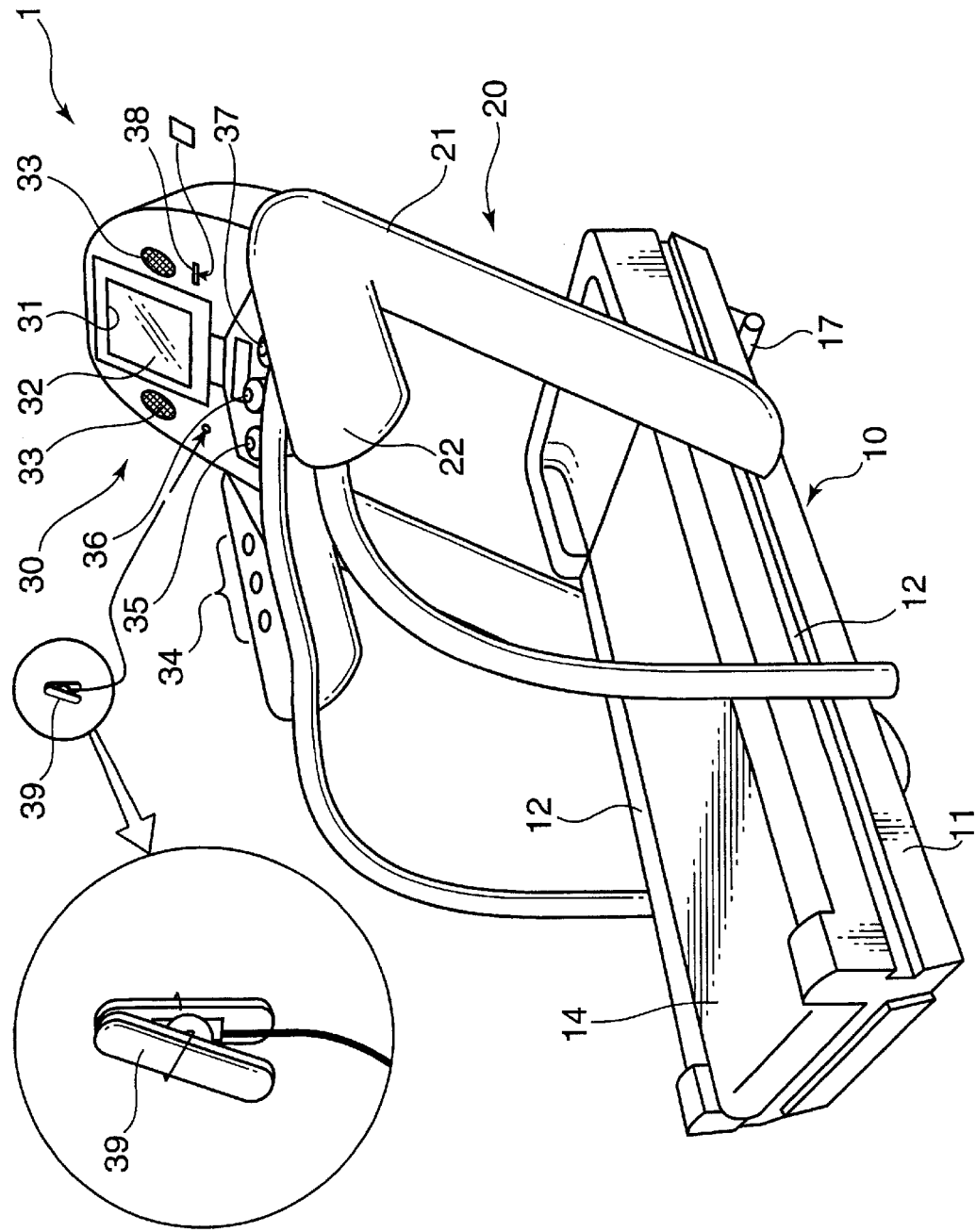
FIG. 1 is a perspective view showing the external configuration of a running machine provided with a running belt as one example of an exercise machine to which the present invention is applied.
Figure 2A:
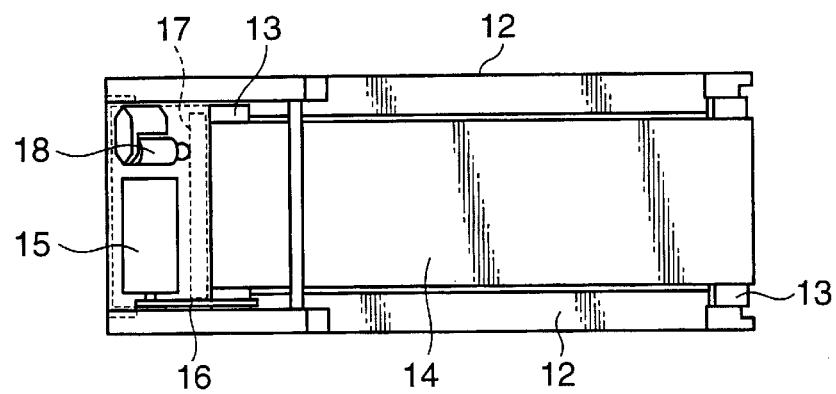
FIG. 2A is a diagram of the running machine when viewed downward from the upper surface of the running belt.
Figure 2B:
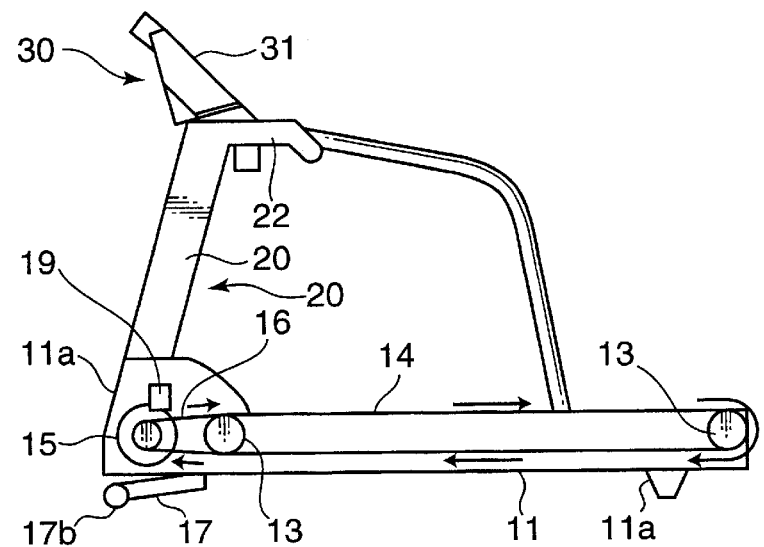
FIG. 2B is a side view in section showing a construction for drivingly turning the running belt.
Figure 2C:
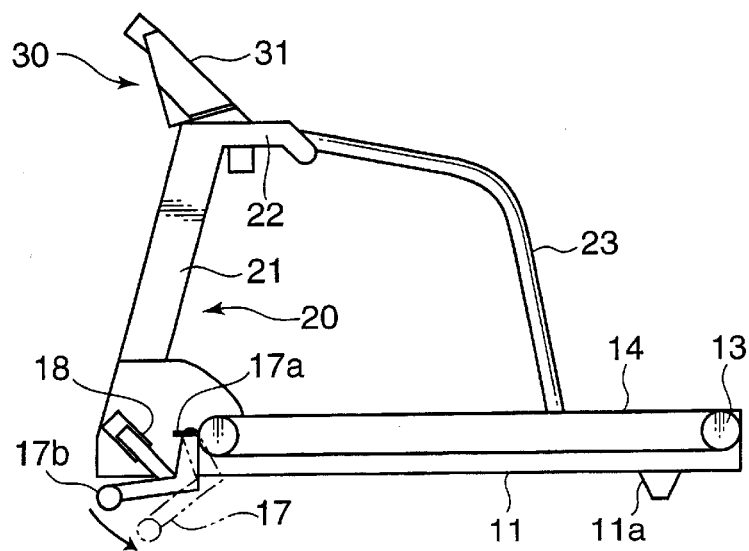
FIG. 2C is a side view in section showing a construction for drivingly inclining the running belt.

FIG. 1 is a perspective view showing the external configuration of a running machine provided with a running belt as one example of an exercise machine to which the present invention is applied, FIG. 2A is a view of the running machine when viewed downward from the upper surface of the running belt, FIG. 2B is a side view in section showing a construction for drivingly turning the running belt, and FIG. 2C is a side view in section showing a construction for drivingly inclining the running belt.

In FIGS. 1 and 2, a running machine 1 is comprised of a running unit 10 at the bottom side, an operation/display unit 30 provided above the front part of the running unit 10 and coupling units 20 for coupling the running unit 10 and the operation/display unit 30.

The running unit 10 functions as a driving unit and is provided with a floor element 11, a pair of guide frames 12, drive rollers 13, a running belt 14, a motor 15, chain 16, a jack 17, and a jack driving device 18. The floor element 11 includes a rectangular parallelepipedic casing having positioning legs 11a to be placed on a floor at the left and right sides (upper and lower sides in FIG. 2A) of the rear side (right side of FIG. 2A) of its bottom surface. The guide frames 12 extend in forward and backward directions at the right and left sides of the floor element 11 and serve as covers. The drive rollers 13 are held in parallel with each other at front and rear positions of the guide frames 12 while being rotatably supported between the two guide frames 12. The running belt 14 is an endless belt mounted between the two drive rollers 13. The motor 15 rotates the drive roller 13 at the front side and serves as a driving device. The chain 16 is mounted between a gear on a rotary shaft of the motor 15 and a gear on a shaft of the drive roller at the front side and serves as a torque transmitting member. The jack 17 includes a leg 17b which turns about a rotary shaft 17a for varying a distance of the front side of the floor element 11 to the floor surface. The jack driving device 18 changes a turned amount of the leg 17b of the jack 17 to adjust an angle of backward inclination of the floor element 11, i.e. an angle of inclination of the upper surface of the running belt 14. The motor 15, the chain 16, the jack 17 and the jack driving device 18 are covered by a covering frame 11b. A rotation sensor 19 detects a turning speed of the running belt 14, i.e. a present running speed of the user by detecting a cycle of a rotation drive pulse of the motor 15 or using a pulse signal detected by a rotary encoder or the like arranged near the rotary shaft.

The coupling units 20 are provided at both left and right sides of the floor element 11, are in downward-opening U-shape, and have the opposite ends fixed at the opposite sides of the floor element 11. Upper parts of the coupling units 20 have substantially horizontal portions of a specified length which are set at such a height substantially coinciding with the positions of both hands of the user doing a running exercise so as to serve as hand rests for the user.

The operation/display unit 30 is arranged at the front side of the coupling units 20, i.e. in front of the user, and is provided in its middle part with a monitor 31 for the image display slightly inclined forward, a transparent touch panel 32 adhered to a display surface of the monitor 31 and loudspeakers 33 for generating specified messages, sound effects, BGMs, etc. The operation/display unit 30 also includes instruction buttons 34 which are arranged immediately before the hand rests at the sides of the coupling units 20 for giving various instructions. The instruction buttons 34 are operable by the user and adapted to give instructions to stop running (stop the driving of the motor), to increase the running speed (increase the rotating speed of the motor), to decrease the running speed (decrease the rotating speed of the motor), and to reset a load (return the jack to its initial position).

In this embodiment, three optical sensors 35 to 37 are arranged before the monitor 31 while being transversely spaced apart at specified intervals. The optical sensors 35 to 37 have the same shape, each being internally provided with a light emitting element and a light receiving element for emitting and receiving an infrared ray. Each optical sensor emits the light substantially upward at a specified angle of directivity and receives (detects) the light reflected by the palm of the user's hand intentionally placed above the optical sensor, whereby the operation of the user, i.e. a specified instruction (instruction to change the direction in this embodiment) can be recognized. The arrangement of the optical sensors 35 to 37 is not limited to the above. For example, the left and right optical sensors 35, 37 may be arranged on the upper surfaces of the coupling units 20. In such a case, these three sensors may have different shapes depending on the planes of arrangement.

Alternatively, a problem of interference can be solved by causing the respective sensors to emit and receive the light in a time-division manner. In this case, the intersection of the adjacent widths of directivity can be alleviated (ignored) to a certain degree. The respective angles of directivity are so set as to maximally prevent the overlapping with those of the adjacent sensors, thereby preventing an error detection. The three optical sensors: the left optical sensor 35, the middle optical sensor 36 and the right optical sensor 37 function as direction changing means to be described later. When the user brings his hand closer to these optical sensors, the running direction on the monitor screen can be changed to left and right or returned to the middle (including a mode in which an instruction can be given to select the running at the right end, the left end or in the middle of the running road as described later). Further, such a mode may be adopted in which the angle is changed in a corresponding direction by a specified angle every time the user's hand is brought closer to the sensor.

At specified positions of the operation/display unit 30 are provided an insertion slot (see FIG. 3) of a card reader 38 for an individual card in which pieces of individual information are stored and an insertion slot (not shown) for a lead wire of a pulse sensor 39. The individual card is a magnetic card, an IC card or the like in which the pieces of individual information and an exercise history information are renewably stored as described later and, through not shown, the card reader 38 enables the reading and writing of an information from and in the inserted individual card. The pulse sensor 39 detects the pulse rate of the user, and has a clip portion for clipping, for example, an earlobe as enlargedly shown. This sensor 39 optically detects a change in a blood flowing amount while clipping the earlobe, i.e. makes a detection based on the level change of an amount of transmitted light.

A control unit 3 (see FIG. 3) formed by a microcomputer for receiving detection signals from the respective elements and outputting control signals thereto is provided in a specified position of the running machine 1. It should be noted that the control unit 3 may be separately provided instead of being provided in the exercise machine.

Figure 3:
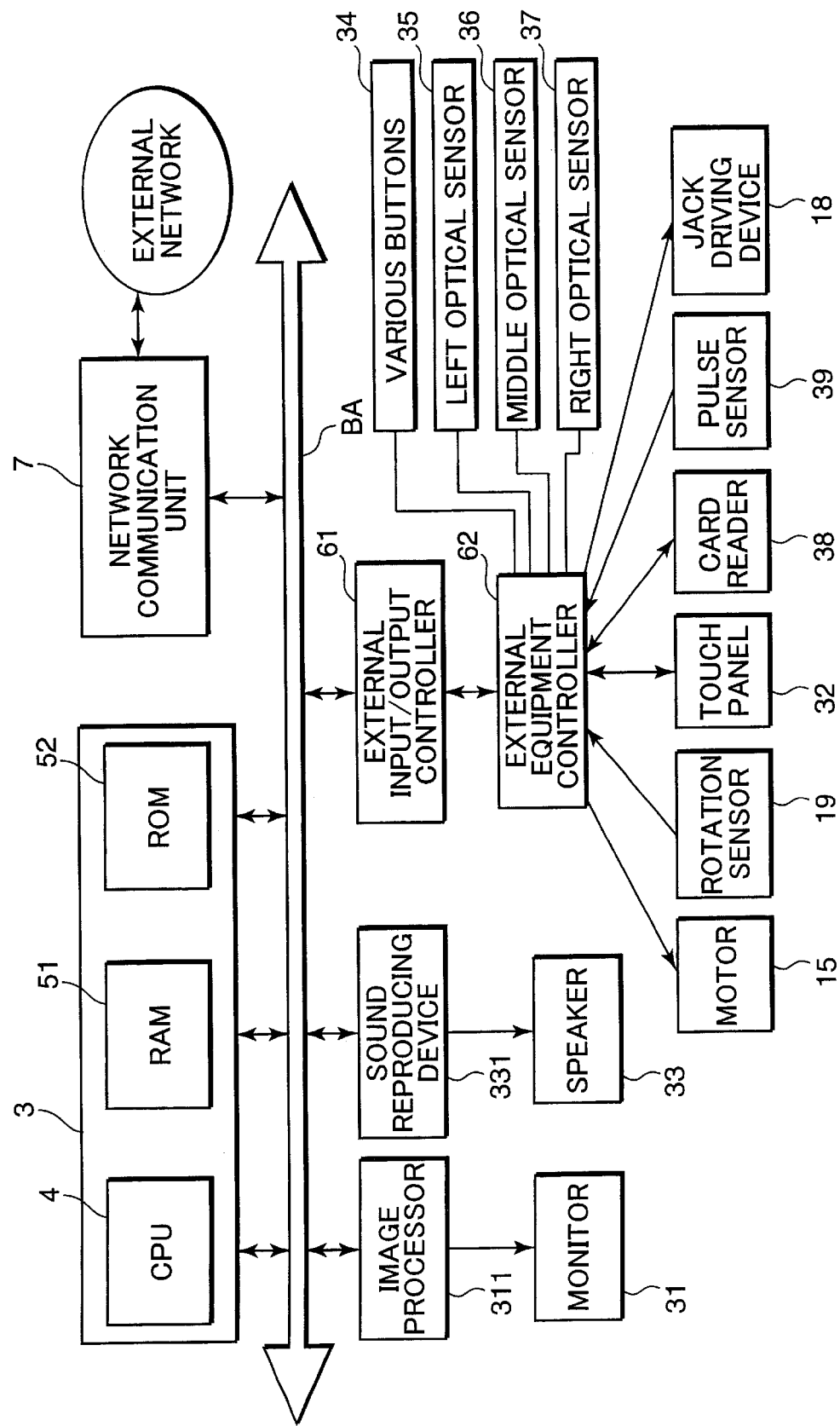
FIG. 3 is a hardware construction diagram showing one embodiment of an exercise assisting apparatus according to the present invention.

FIG. 3 is a hardware construction diagram showing one embodiment of the exercise assisting apparatus according to the present invention. The control unit 3 controls the overall operation of this exercise assisting apparatus, and is provided with an information processor (CPU) 4, a RAM 51 for temporarily saving an information being processed, and a ROM 52 in which pieces of specified image information, various data used for the exercise assistance, a control program for the exercise assistance, a control program for the exercise assistance, a game program, etc. are stored in advance. Out of what is stored in the ROM 52, at least the control program, the game program and the like that are influenced by a change of the exercise content or an assisting method may be stored in a detachably mountable external storage medium. A bus BA is a data transmission path.

An external input/output controller 61 converts the detection signals into digital signals to be processed and outputs a command information by converting it into a control signal for the actuator between the control unit 3 and actuators (the motor 15, the card reader (reader/writer) 38 (writing) for the card) and the jack driving device 18). The controller 61 performs such signal processing and input/output processing, for example, in a time-division manner. An external equipment controller 62 outputs the control signals to the respective actuators and inputs the detection signals from the respective detectors during the respective time-division periods.

An image processor 311 displays a specified image on the monitor 31 in accordance with an image display command from the control unit 3 and includes a video RAM and the like. A sound reproducing device 331 outputs a specified message, a BGM or the like to the loudspeakers 33 in accordance with a command from the control unit 3.

A touch panel 32 is a rectangular thin layer element and is formed, for example, by covering pressure sensitive members made of a linear transparent material arrayed at specified intervals in vertical and horizontal directions by a transparent cover. The touch panel 32 is adhered to the display surface of the monitor 31 (to a tube surface in the case of a CRT). The touch panel 32 having a known construction can be adopted. For example, a touch panel produced by printing long pressure-sensitive conductive inks, e.g. made of a thermoplastic resin in which conductive particles and nonconductive particles are diffused and mixed at corresponding positions of facing surfaces of two flexible film bases and then adhering these two film bases together may be used. Further, lead wires are connected with the respective pressure-sensitive conductive inks while being insulation-coated and drawn out of the films, wherein a specified voltage is applied to the lead wires of the one film base, and a circuit for detecting the voltage is so connected with the lead wires as to recognize the respective lead wires. Fine unevenness (resulting from the presence of fine particles during printing) is formed on contact surfaces of the pressure-sensitive conductive inks of the two film bases adhered together, a voltage appearing on the other lead wire as a result of a change in the substantial contact area of the ink surface, i.e. a resistance change on the contact surface brought about by a pressure exerted on the film base surface by a finger (or pushing pen, etc.) can be detected in an analog manner. In this way, a pressed position can be detected. Which one of the buttons displayed on the screen of the monitor 31 to urge the player to select has been pressed can be discriminated based on the addresses of the buttons and the pressed position.

In this embodiment, pieces of information in the individual card 18 includes the weight, target calorie consumption, target period, calorie consumption result, dates and results of training for the past several times (training history), number of remaining prepaid trainings, athletic ability (past average angle of inclination of the running belt 14), game score in addition to fixed information such as individual code (ID code), date of birth and sex.

Figure 5:
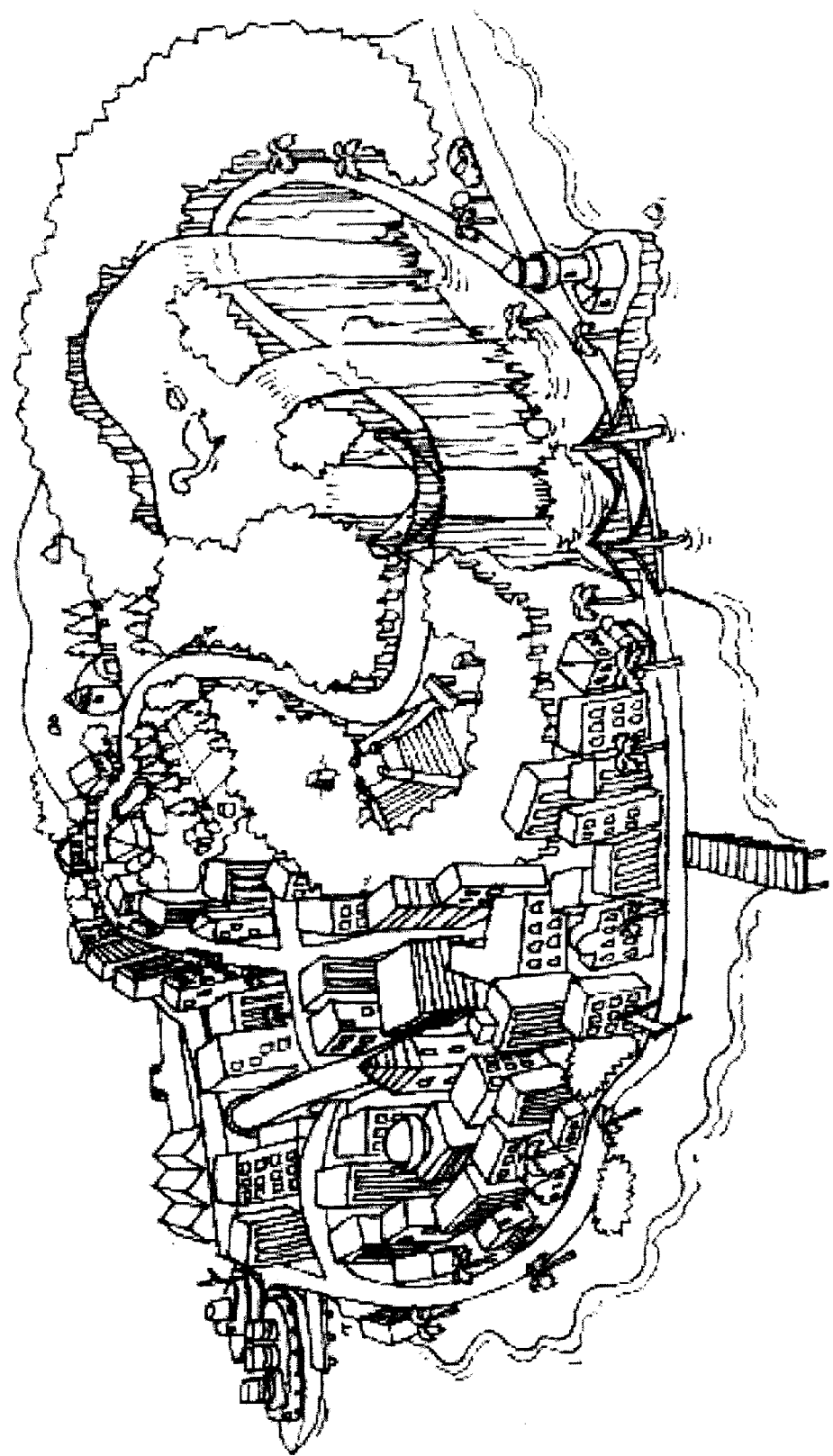
FIG. 5 is a diagram showing one example of a supposed view of the world in a virtual space.

In the ROM 52 are stored various objects such as a running road, buildings, and natural objects forming a virtual space: a three-dimensional space in this embodiment; and images of a trainer character 101, a roll-playing character 102 simulating the user and various obstacle characters appearing in the game executed. The virtual space supposes such a view of the world as shown in FIG. 5 as an example and includes a town having many houses and buildings and the running road comprised of a road extending around the town, branch roads and junctions. Each of the trainer character 101, the roll-playing character 102 and other images is formed by a specified number of polygons so as to be represented in a three-dimensional manner. In accordance with an imaging command from the CPU 4, the image processor 311 mainly performs the calculation of a viewpoint position (in this embodiment, changes in the height and the direction of the camera as described later), the calculation in the 3D space for the viewpoint, the calculation to convert a position in the 3D space to a position in a simulated 3D space, the calculation of a light source, writing of an image data to be formed in the video RAM based on the above calculation results, e.g. writing (adhering) of a texture data in an area of the video RAM designated by the polygon.

Here, a relationship between the operation of the CPU 4 and that of the image processor 311 is described. In accordance with an operating system stored in the ROM 52 which is built in or detachably mounted from outside, the CPU 4 reads the images, the sounds, the control program and the game program from the ROM 52. Part or all of the read image, sound and control program are saved in the RAM 51. Thereafter, the CPU 4 proceeds the processing in accordance with the control program and data (image data including polygons and textures of objects to be displayed and other character (alphanumeric) images, sound data) saved in the RAM 51, the detection signals from the detectors, and the contents of instructions given through the operation of the user. Specifically, the CPU 4 suitably generates commands as tasks to form images and output sounds in accordance with the detection signals and the contents of instruction from the user. The image processor 311 performs the calculation of the viewpoint, the calculation of the positions of the characters in the 3D space (of course, the same applies to a two-dimensional space) in relation to the viewpoint, the calculation of the light source, the generation of the sound data, and processing in accordance with the above command. Subsequently, the CPU 4 writes the image data of the image to be formed in the video RAM in accordance with the above calculation results. The image data written in the video RAM is fed to the monitor 31 (after being fed to the D/A converter via the interface and converted into an analog video signal), and is displayed as an image on the tube surface of the monitor 31. On the other hand, the sound data outputted from the sound reproducing device 331 is outputted as sounds from the loudspeakers 33 (via an amplifier after being fed to the D/A converter via the interface and converted into an analog video signal).

Imaging commands include those used to generate 3D images using polygons and those used to generate usual 2D images. Here, polygons are polygonal 2D virtual figures: triangular or rectangular in this embodiment. The image command used to generate a 3D image using the polygons includes a polygon vertex address data, a texture address data representing the saved positions of the texture data to be adhered to the polygons, a color palette address data representing the saved positions of the color palette data indicating the colors of the texture data, and a luminance data representing the luminance of the textures, these data being read from the ROM 52. One object is formed by a multitude of polygons. The CPU 4 saves the coordinate data of the respective polygons in the 3D space in the RAM 51. In the case that the character or the background image is moved, i.e. the viewpoint is changed, on the screen of the monitor 31, the following processing is performed. Specifically, the CPU 4 successively calculates 3D coordinate data of the respective polygons after movement and rotation based on the 3D coordinate data of the vertices of the respective polygons temporarily saved in the RAM 51 and movement amount data and rotation amount data of the respective polygons. Among the thus calculated 3D coordinate data of the respective polygons, coordinate data in horizontal and vertical directions are fed to the image processor 311 as the address data in a display area of the RAM 51, i.e. as the polygon vertex address data. The image processor 311 writes the texture data represented by the texture address data allotted in advance in the triangular or rectangular display area represented by three or four polygon vertex address data. In this way, an object (character, etc.) on which the texture data are adhered to a multitude of polygons is displayed on the display surface of the monitor 31.

Among various data stored in the ROM 52, those that can be stored in a detachably mountable storage medium may be made readable, for example, by a hard disk drive, an optical disk drive, a flexible disk drive, a silicone disk drive, a cassette medium reader or like drive. In such a case, the storage medium is, for example, a hard disk drive, an optical disk drive, a flexible disk drive, a CD, a DVD, a semiconductor memory or the like.

A network communication unit 7 is adapted to renewably save various pieces of information renewed in the individual card 18 upon the completion of the training in an unillustrated administration server via an external network (Internet, etc.). If the training history and the like of the users can be collectively administrated, a list of the users having highly accomplished their targets or a list of the users having high game scores (having small values in such a mode as to express the scores by time) to be described later can be displayed in ranking on a monitor installed in a gym or fitness studio for the information purpose, whereby the users are more urged to train. Further, if an address information of the administration server is notified to the users (members), the members can individually confirm their own training histories and the like via their own communication instruments.

Figure 4:
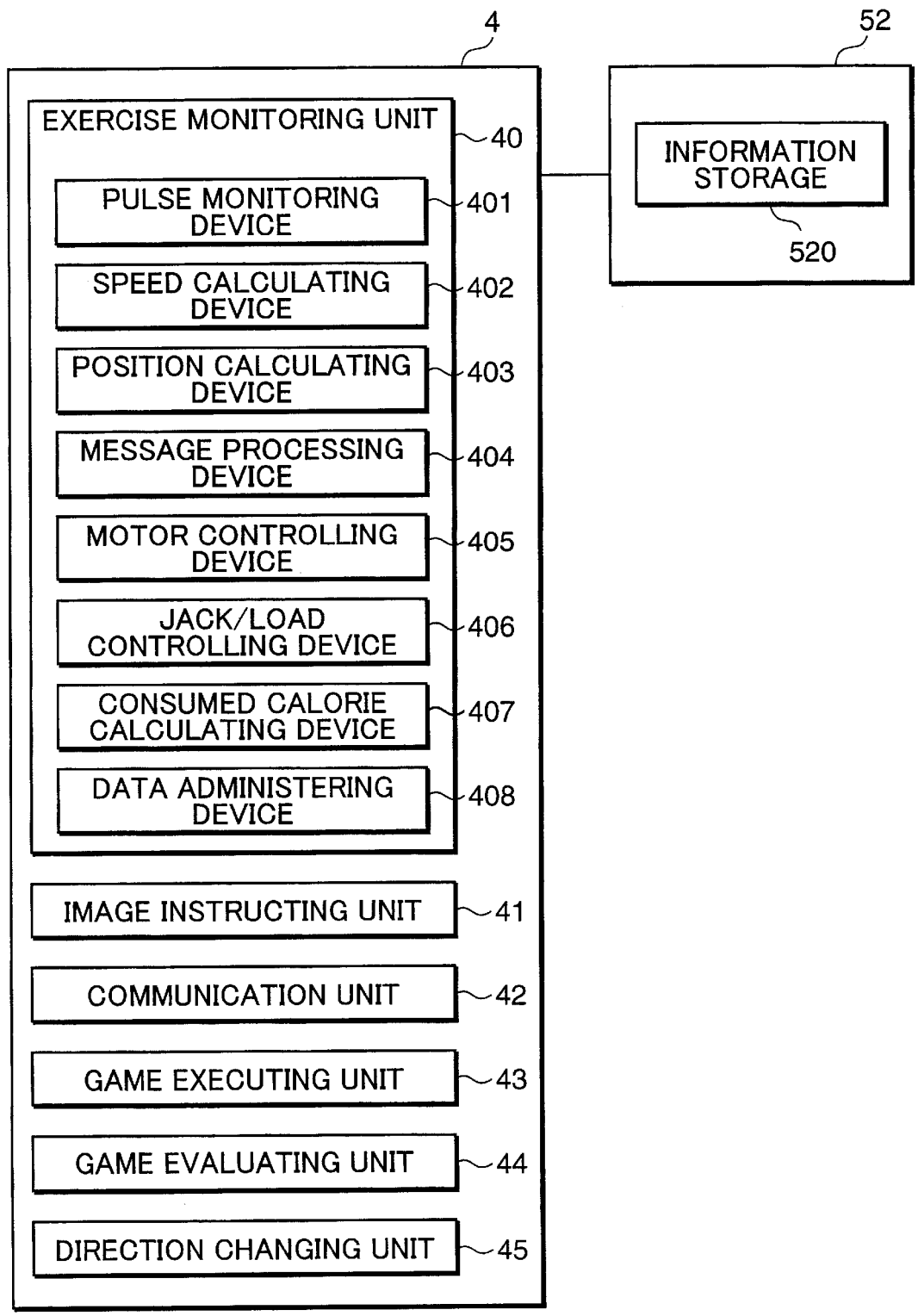
FIG. 4 is a software construction diagram of a CPU.

FIG. 4 is a software construction diagram of the CPU 4. The CPU 4 includes an exercise monitoring unit 40, an image instructing unit 41, a communication unit 42 for controlling the reading and writing of the data in and from the individual card 18, a game executing unit 43 for the game processing, a game evaluating unit 44, and a direction changing unit 45. The CPU 4 also includes a training timer for monitoring a training time and a timer for measuring a time difference at the time of executing the game.

The exercise monitoring unit 40 is provided with a pulse monitoring device 401, a speed calculating device 402, a position calculating device 403, a message processing device 404, a motor controlling device 405, a load controlling device 406, a consumed calorie calculating device 407, and a data administering device 408. The pulse monitoring device 401 calculates the pulse rate per minute based on the detection signal from the pulse sensor 39 and monitors a difference between the calculated pulse rate and a set target value. The speed calculating device 402 calculates the turning speed of the running belt 14 (virtually running speed of the user) based on the cycle of the rotation signal from the rotation sensor 19. The position calculating device 403 calculates a position from a starting point (running distance), i.e. a current position based on the calculated speed. The message processing device 404 displays advices (including warnings) suitably reflecting the difference between the pulse rate information monitored by the pulse monitoring device 401 and the target pulse rate and/or the information of at least one of the speed calculating device 402 and the position calculating device 403 on the monitor 31 in a superimposed manner. The motor controlling device 405 adjusts the rotating speed of the motor 15 for turning the running belt 14. The load controlling device 406 changes the inclination of the running belt 14 by varying a driving amount of the jack driving device 18 in accordance with the pulse rate information monitored by the pulse monitoring device 401 or an inclination information of the running road obtained from a position information and an elevation information specifying the running road in the view of the world stored in the ROM 52. The consumed calorie calculating device 407 calculates a consumed calorie per unit time based on the speed calculated by the speed calculating device 402, the pulse rate calculated by the pulse monitoring device 401, the age, weight and other parameters read from the individual card, and calculates the calorie consumed from the start of the exercise to the present by multiplying the calculated consumed calorie per unit time by the exercise time. The data administering device 408 administers various individual data including the training history. It should be noted that the consumed calorie calculating device 407 may obtain the consumed calorie per unit time by reading it from a table memory storing a table of consumed calories per unit time in relation to the above parameters beforehand.

The image instructing device 41 sends the imaging commands as described above to the image processor 311.

The game executing unit 43 executes a specified game during the exercise at random, regularly or in accordance with the user' instruction. In this embodiment, a game in which obstacles appearing on the running road in the background image for the roll-playing character 102 are avoided is adopted. The game evaluating unit 44 gives a score according to the skill in avoiding.

The direction changing unit 45 is comprised of the optical sensors 35, 36, 37, and changes the running direction of the roll-playing character 102 on the screen of the monitor 31 toward the left end (left half), toward the right end (right half) or toward the center in accordance with the sensed optical sensor every time the operation of the user is sensed.

Figure 6:
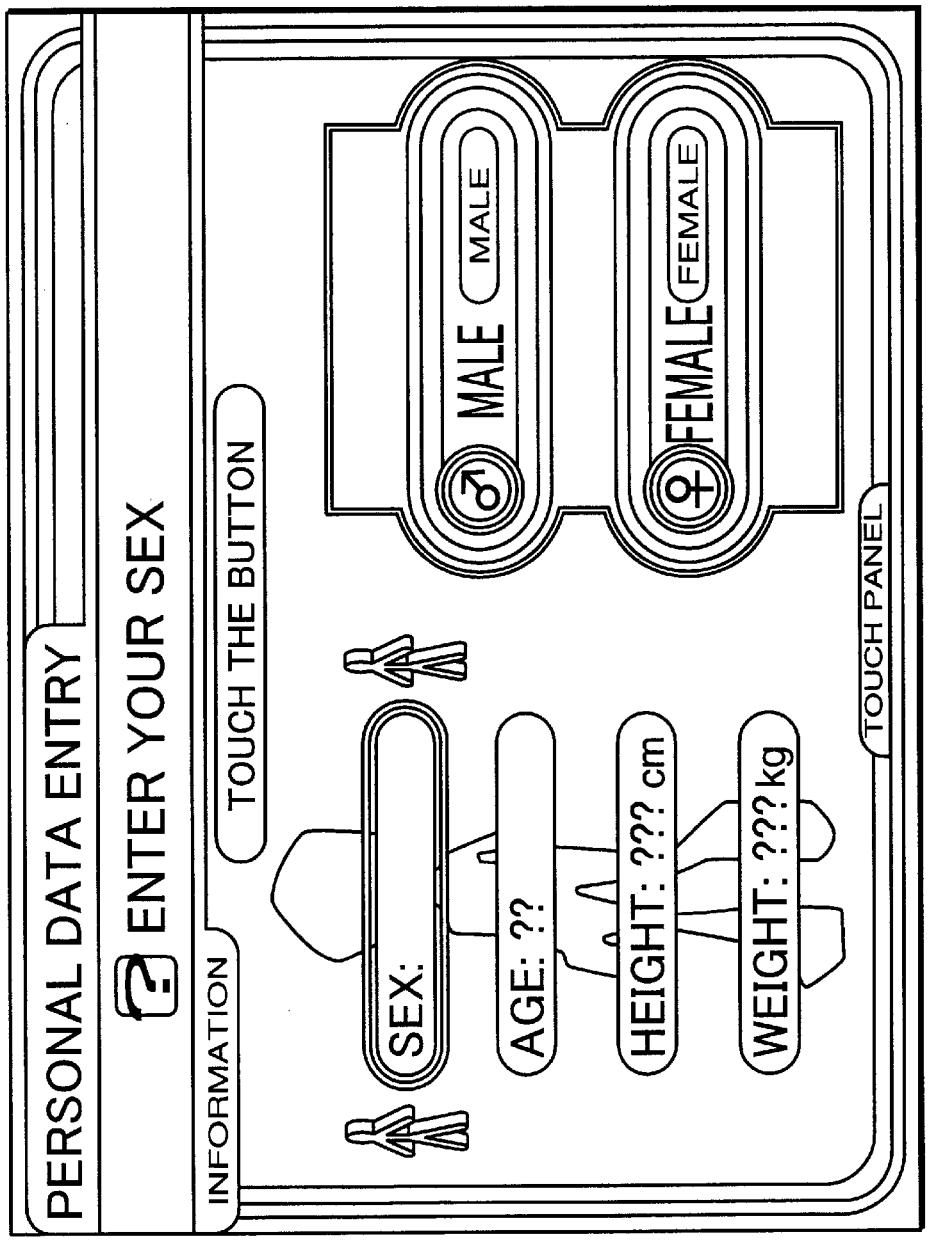
FIG. 6 is a diagram of a screen used to guide the entry of sex.
Figure 7:
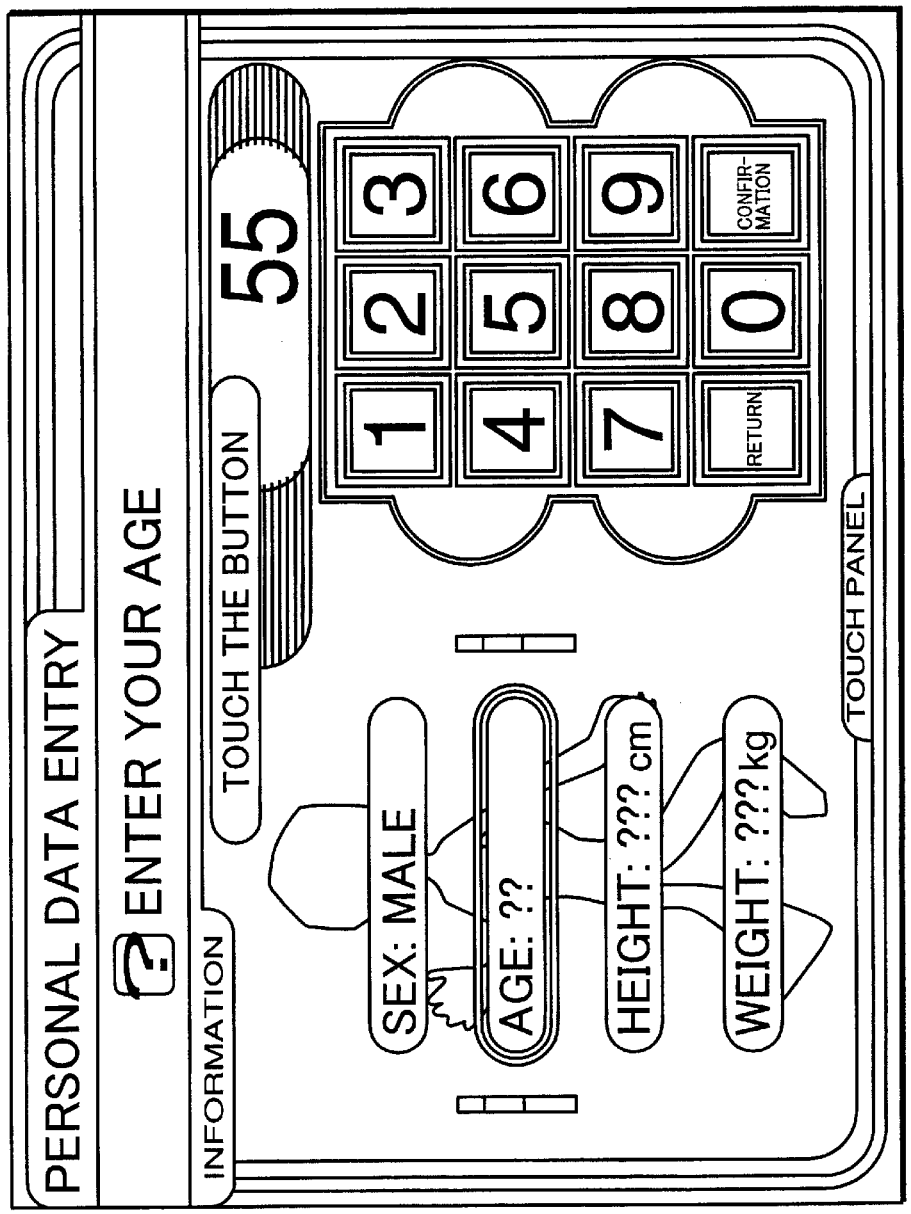
FIG. 7 is a diagram of a screen used to guide the entry of age.
Figure 8:
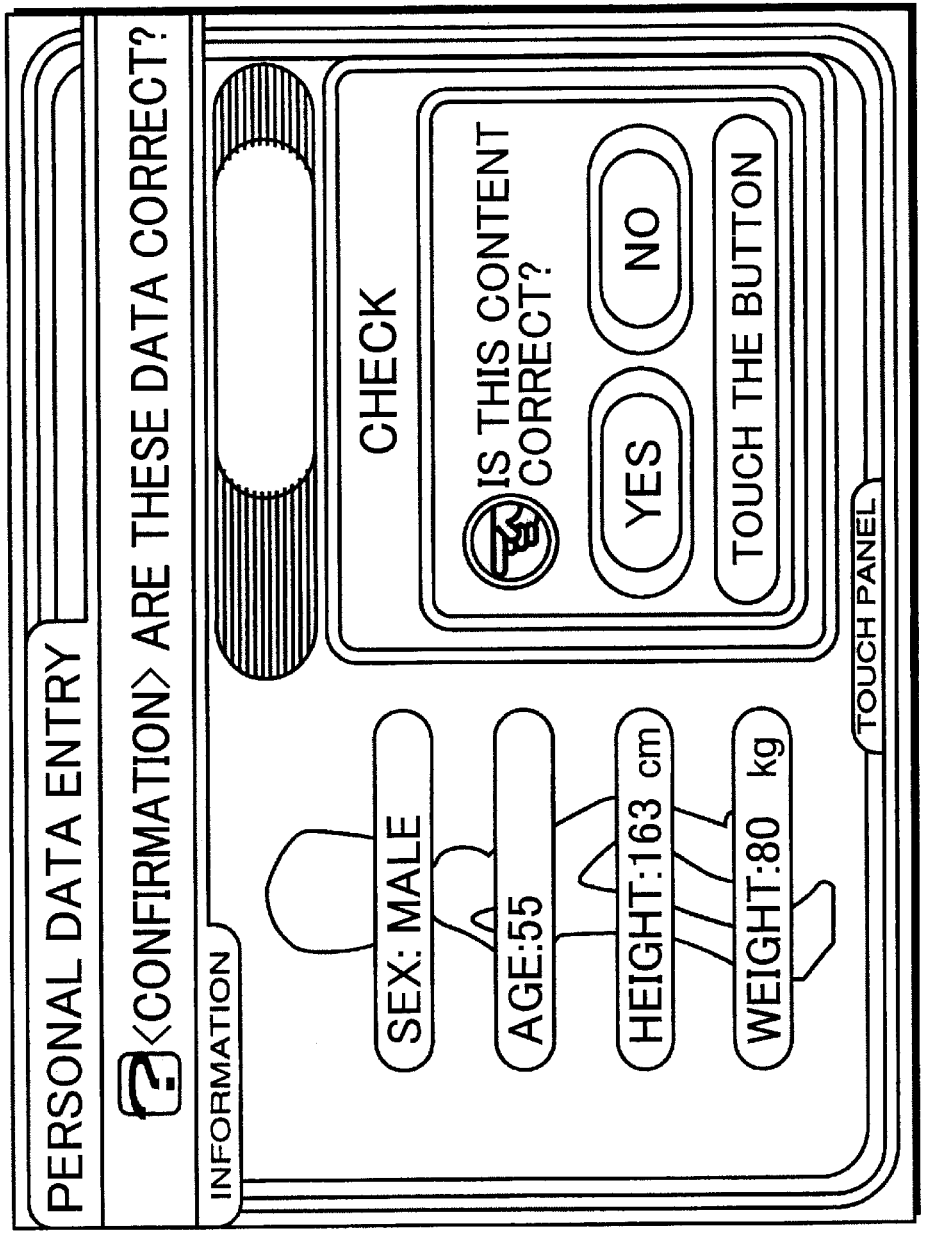
FIG. 8 is a diagram of a screen used to confirm the contents of the entries.

Subsequently, images to be displayed on the monitor screen are described with reference to FIGS. 6 to 14. FIG. 6 shows an initial screen switched from a standby screen when a specified position of the touch panel 32 is pressed, and buttons of "Male" and "Female" are selectably displayed together with a sentence guiding the entry of sex. Upon the completion of the selection by pressing the button, the screen is switched to the one shown in FIG. 7. FIG. 7 shows a screen used for the entry of age, and a sentence guiding the entry of age and a matrix of numbers "0" to "9" are displayed on this screen. The user's age is displayed for confirmation by pressing the corresponding numbers. For example, if "5", "5" are successively pressed, the age "55" is displayed for confirmation. Among squares, the one in the first column of the fourth row is used for return (enabling reentry), and the one in the third column of the same row is used for confirmation. FIG. 8 shows a next screen displaying the entered height and weight of the user after the age is entered. This screen is used to confirm whether or not the inputted contents are correct. On the screen are displayed a "YES" button used for affirmation and a "NO" button used for negation.

Figure 9:
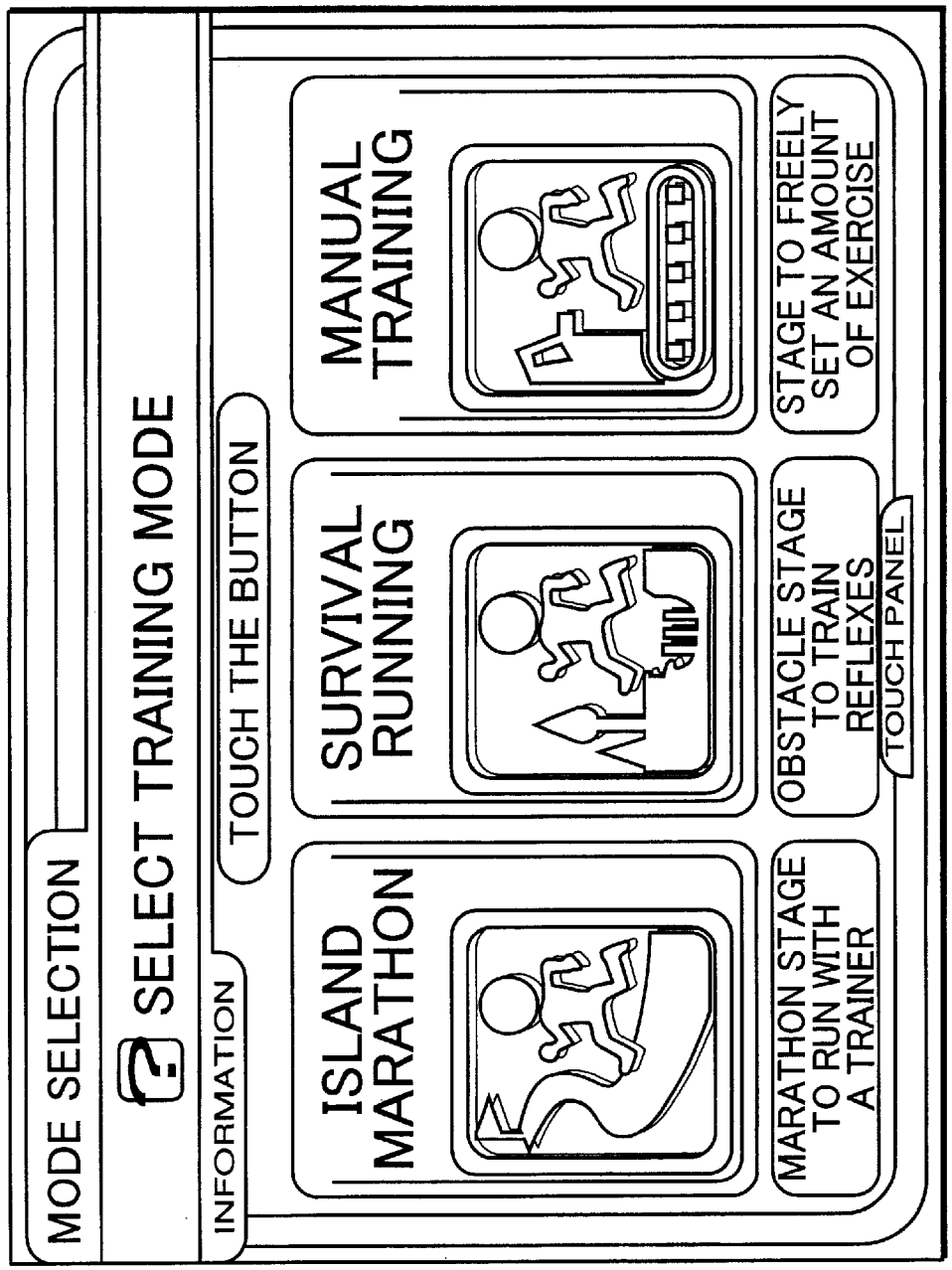
FIG. 9 is a diagram showing a guide screen used for the selection of the kind of an exercise (training mode)

FIG. 9 shows a screen which comes up when the "YES" button is pressed on the screen of FIG. 8 and is a guide screen for urging the user to select the exercise course (training mode). An "Island Marathon" course which is a marathon stage where the user virtually runs a relatively long distance together with a trainer, a "Manual Training" course which is a stage where an exercise amount can be freely set, and a "Survival Running" course which is an obstacle stage to train reflexes are selectably displayed. Particularly, a game to avoid obstacles appearing on the running road is played in the "Survival Running" course for a trained strong body.

Figure 10:
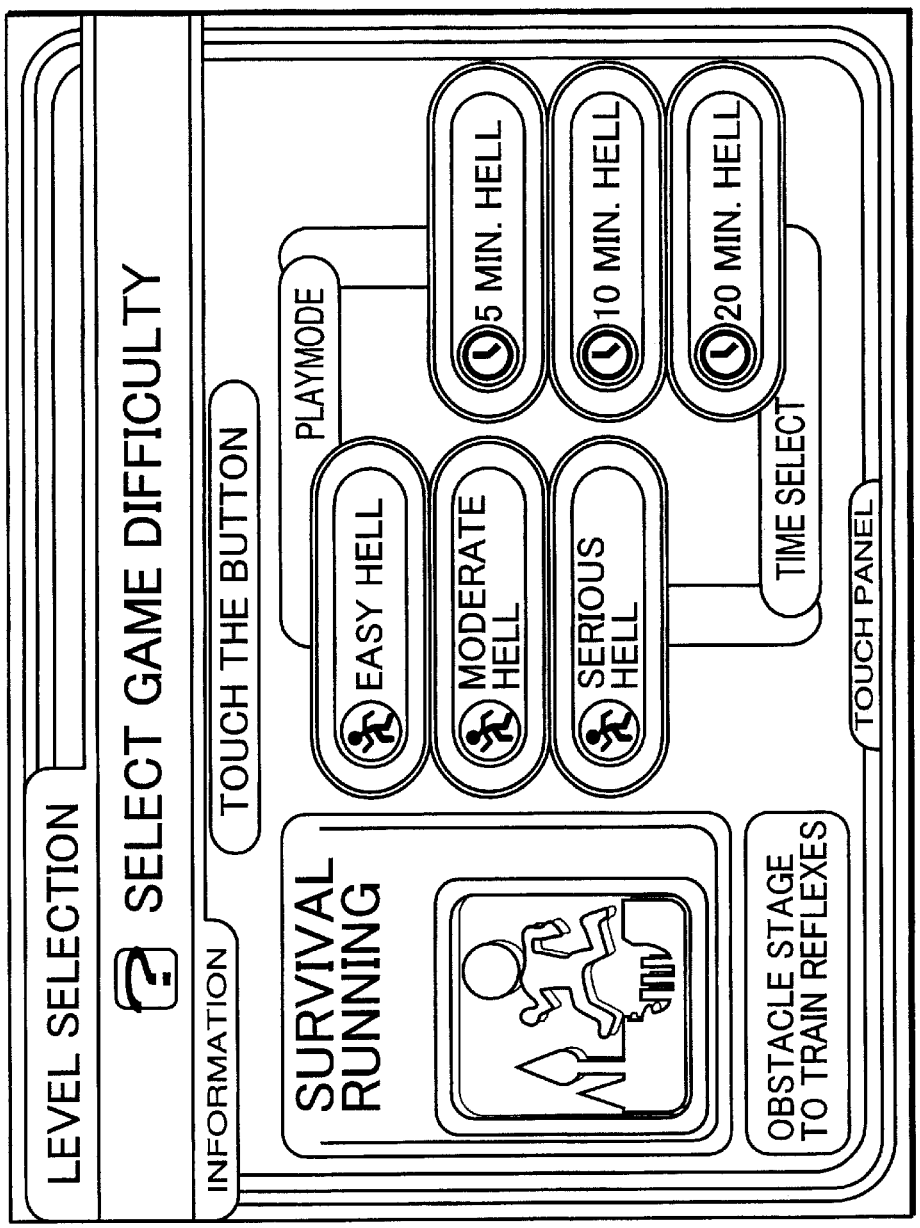
FIG. 10 is a diagram of a screen used to guide the selection of a degree of game difficulty when a "Survival Running" course is selected.
Figure 11:
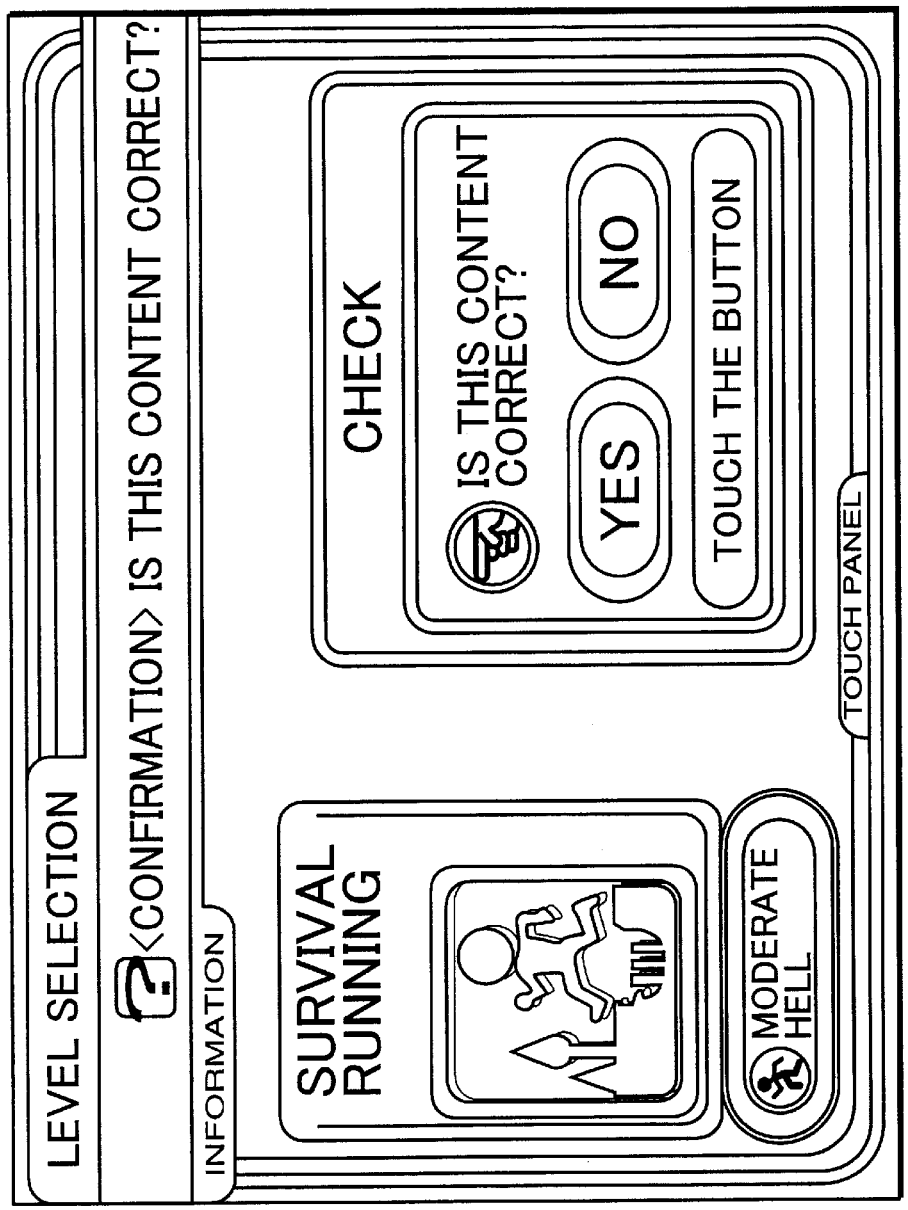
FIG. 11 is a diagram of a screen used to confirm the selection of the game difficulty.

FIG. 10 shows a screen guiding the selection of a degree of game difficulty when the "Survival Running" course is selected. The degree of difficulty increases from "Easy Hell" to "Moderate Hell", and to "Serious Hell". In this embodiment, courses of 5 min., 10 min. and 20 min. are selectably prepared. FIG. 11 shows a screen used to confirm the selection of the degree of game difficulty, whereon "YES", "NO" buttons are selectably displayed. Upon the completion of the above selections, the turning of the running belt 14 is started.

Figure 12:
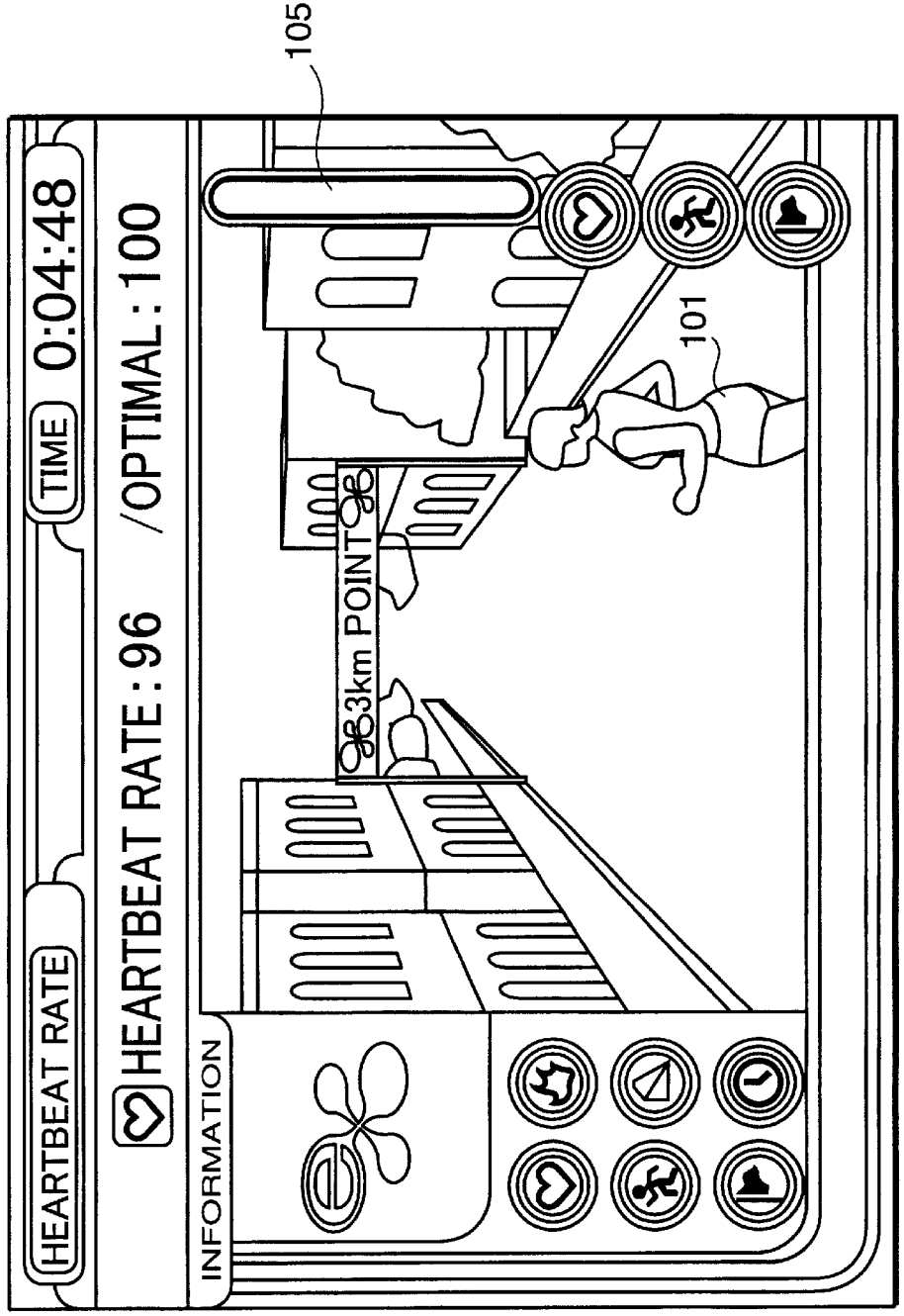
FIG. 12 is a diagram of a screen displayed upon the lapse of, e.g. 4 min. 48 sec. after the start.

FIG. 12 is a diagram showing a screen upon the lapse of, e.g. 4 min. 48 sec. after the start. On the screen is displayed a scenery image in which the straight running road stretches in the middle and buildings stand along the opposite sides of the running road. The trainer character 101 is displayed at the front side of the running road. In this embodiment, a viewpoint of the virtual camera is set at the eyes of the roll-playing character 102. The viewpoint of the virtual camera may be set slightly behind the head or the waist of the roll-playing character 102 so that both the roll-playing character 102 and the trainer character 101 can be displayed on the screen. The viewpoint of the virtual camera is controllably moved along the running road at a speed corresponding to the speed information obtained by the speed calculating device 402 based on the rotation signal from the rotation sensor 19 and the position of this viewpoint is relatively moved in accordance with the position information obtained by the position calculating device 403, i.e. the scenery image is relatively moved in a direction opposite from the running direction of the roll-playing character 102. In this way, the running movement is expressed.

Further, the lapse of time and the heartbeat rate (pulse rate) per min. are constantly displayed on the screen. On this screen, 4 min. 48 sec. have elapsed after the start and the user's heartbeat rate is "96". The user is exercising in a substantially suitable state assuming that the target heartbeat rate is set at "100". In such a case, the display of the heartbeat rate may be switched to the display of such a message as to maintain the present pace from the trainer character 101 on the screen. Specifically, various messages (including various expressions given to continue the exercise such as "Slower" and "Faster") corresponding to exercising states, particularly a difference between the set pulse rate and the presently detected pulse rate may be prepared and stored in the ROM 52 beforehand, and the exercise monitoring unit 40 displays suitable messages in consideration of the lapse of time, the load condition and various other parameters. Further, pieces of information allotted to six image buttons at the lower-left side of the screen such as the consumed calorie up to the present, the present running speed and the maximum heartbeat rate may be displayed when the user presses any of these buttons. In such a case, the heartbeat rate having been initially set is displayed again after one of these pieces of information is displayed for a predetermined period. In this way, the limited screen can be used as a multiscreen to display more information.

The buttons 34 provided at the sides of the coupling units 20 give the user an opportunity to change the load condition (the angle of inclination and the running speed) including the stop of the exercise.

Figure 13:
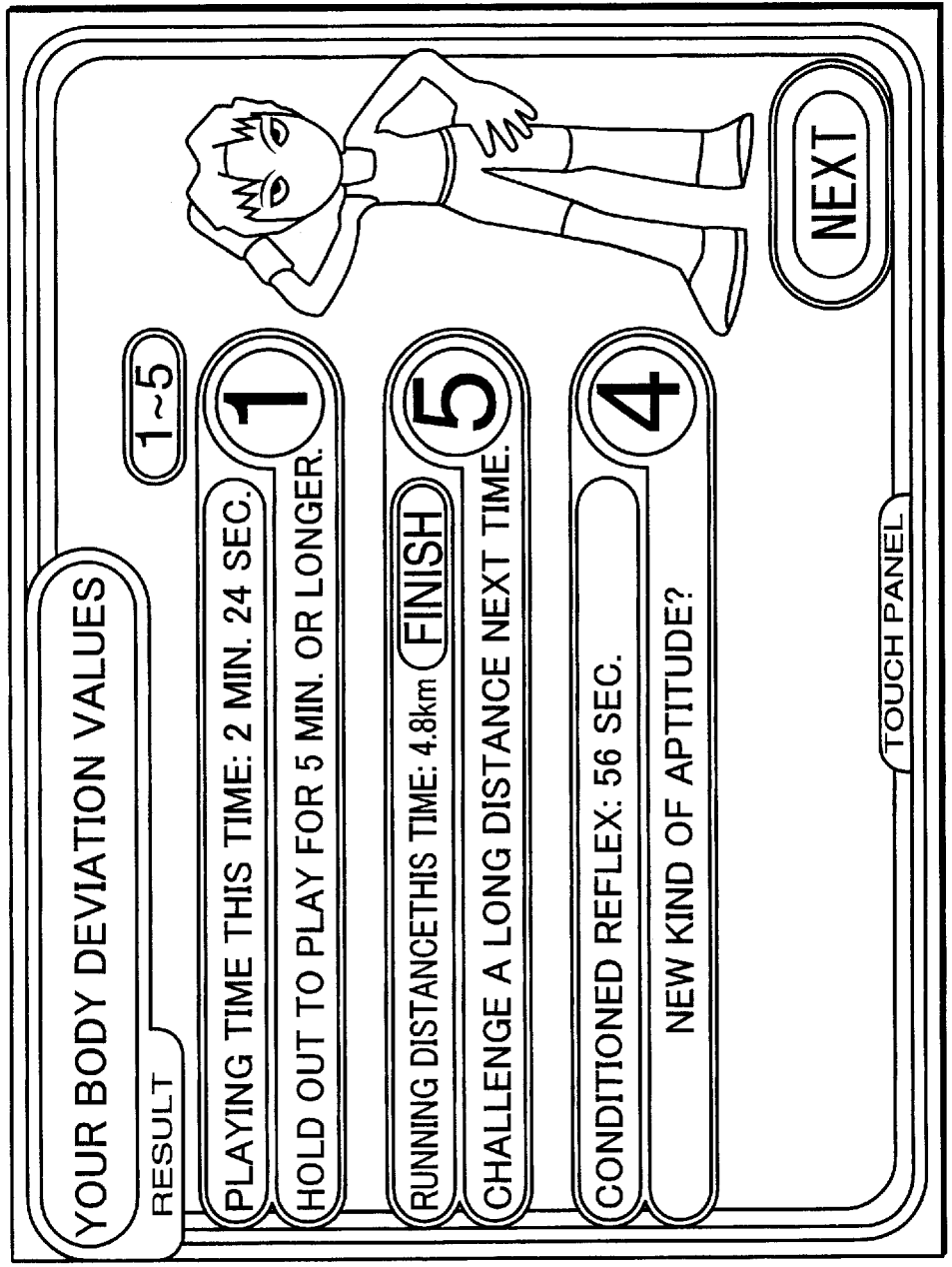
FIG. 13 is a diagram of a screen showing the first page of "Results"
Figure 14:
FIG. 14 is a diagram of a screen showing the second page of "Results"

FIG. 13 shows a screen coming up upon the completion of the exercise to show "Results". On this screen are displayed the lapse of time (playing time this time) from the start to the end, a comment thereon, a running distance and a comment thereon, a time information (average reflex time) shown to notify the evaluation of a conditioned reflex and a comment thereon. On a succeeding screen shown in FIG. 14 are shown an average pulse rate and a comment thereon, a total consumed calorie this time and an easily understandable message related thereto. Further, a body age is calculated in accordance with an equation or the like (or conversion table) conforming to a specified rule using the respective items mentioned above or necessary items and is displayed in comparison with the actual age (numerical value entered on the age entry screen).

Figure 15A:
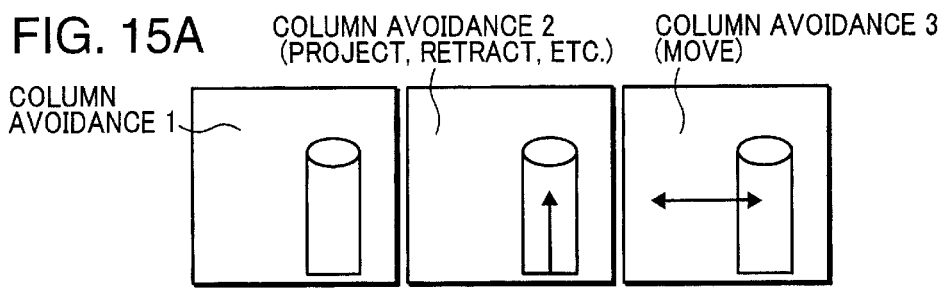
Figure 15B:
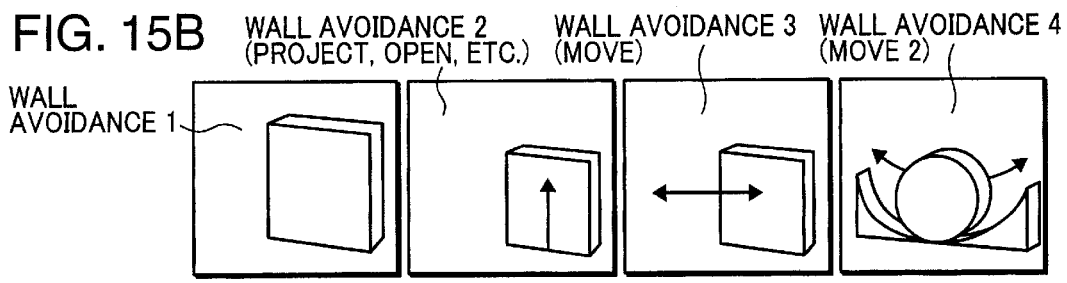
Figure 15C:
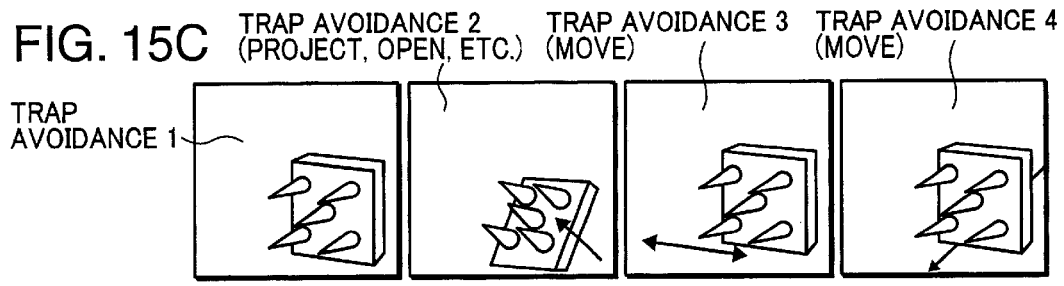
Figure 15D:
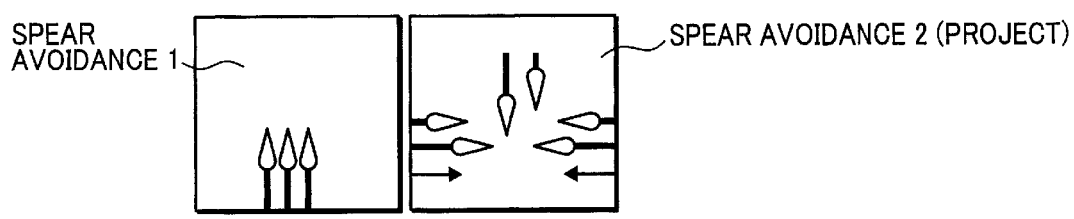
Figure 15E:
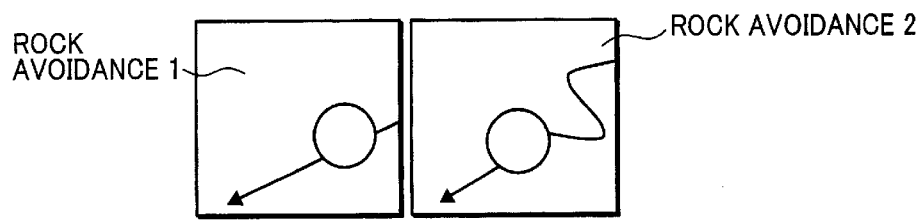
Figure 15F:
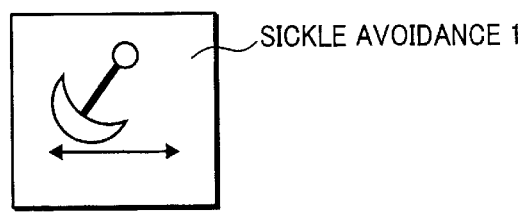

Next, the game related to the "Conditioned Reflex" displayed as a play result in FIG. 13 is described with reference to FIGS. 15 to 17. FIGS. 15A to 15F are diagrams showing the kinds and movements of obstacle characters, wherein FIG. 15A shows a column character; FIG. 15B a wall character; FIG. 15C a trap character; FIG. 15D a spear character; FIG. 15E a rock character and FIG. 15F a sickle character. The images of the respective characters are stored in relation to their movement data and the moving program in the ROM 52 or the like and are controlled by the game executing unit 43 to appear at intended places and intended times or randomly on the running road in accordance with a specified game rule or by being selected at random. The movements of these images are set in conformity with the properties of the obstacle characters. The column character of FIG. 15A has a mode of appearing at the left and right side or the middle position of the running road, a mode of repeatedly projecting and retracting from the ground or the ceiling, and a mode of repeatedly reciprocating along transverse direction on the running road. The wall character of FIG. 15B has a mode of repeatedly projecting and retracting from the ground or the ceiling, a mode of repeatedly reciprocating along transverse direction on the running road and a mode of rolling to left and right in the case of a round wall character. The trap character of FIG. 15C has a mode of appearing at the left and right side or the middle position of the running road, a mode of being lifted up from the ground surface, a mode of repeatedly reciprocating along transverse direction on the running road and a mode of approaching the virtual camera. The spear character of FIG. 15D has a mode of appearing at the left and right side or the middle position of the running road and a mode of flying out toward the center from the upper left and right sides. The rock character of FIG. 15E has a mode of crossing the running road while linearly approaching the virtual camera and a mode of crossing the running road while approaching the virtual camera in a zigzag manner. The sickle character of FIG. 15F has a mode of transversely swinging while being hung down from the ceiling.

Figure 16:
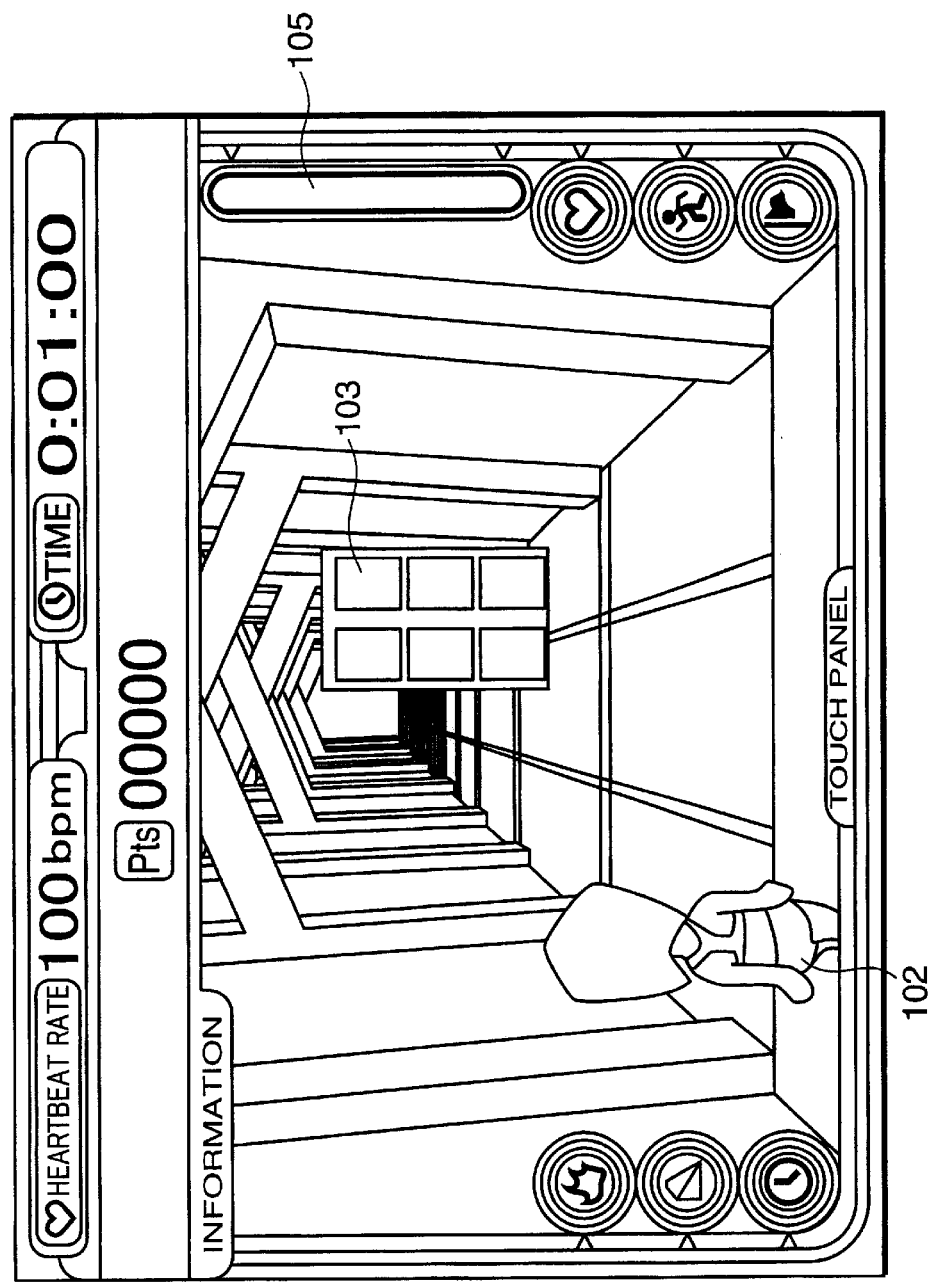
FIG. 16 is a diagram showing a state where a wall character has appeared on the right side of a running path in front of a roll-playing character.

FIG. 16 shows a scene where a wall character 103 appears at the right side of the running road before the roll-playing character 102. In this case, the user can change the running direction to the left side of the running road as shown in FIG. 16 by placing his palm above the left optical sensor 35. As a result, a collision with the wall character 103 can be avoided. After the start of the running exercise, an advice is given concerning how to use the left, middle and right optical sensors 35 to 37. If it is assumed, for example, that the scene shown in FIG. 16 is used for such an advice, an advice such as "Place the palm above the sensor located in such a direction as to avoid the obstacle." or "You can move in a direction that you place the palm" is given immediately before the scene of FIG. 16 comes up. If no operation is made or the roll-playing character 102 collides despite such an advice concerning the optical sensors, the game executing unit 44 judges that the user has not learnt yet how to operate the optical sensors and teaches the user how to operate by causing a similar or different character to appear until the user succeeds in avoiding the character, or only once or a specified number of times more than once.

The game executing unit 43 causes the obstacle character to appear immediately before the position of the virtual camera (present position of the roll-playing character 102) using the virtual camera position information from the position calculating device 403. Appearing timings are decided in accordance with a specified rule. For example, a mode of appearing the obstacle characters at random, a mode of appearing them at specified positions or a mode of appearing them at specified time intervals may be adopted or these modes may be adopted in combination. In the mode of appearing the obstacle characters at random, the user can have a certain kind of expectation since the game can be executed at any position of the running road. In the mode of appearing the obstacle characters at the specified positions, the user can have a certain kind of expectation since the game can be always executed at the specified positions of the running road. In the mode of appearing the obstacle characters at specified time intervals, a problem of getting bored to the simple running exercise can be solved since the game is executed at preset time intervals. In this way, whether or not the roll-playing character 102 can avoid the collision with the obstacle characters is decided by quickness in avoiding the obstacle characters or by the operation timing in the case that the obstacle characters are moving. The user's reflex and quickness can be precisely evaluated through the above operations the user is required to make. Such an evaluation is made by the game evaluating unit 44. The evaluation by the game evaluating unit 44 can be made as follows. The evaluation is made based on a time difference between the appearance of the obstacle character when the timer is started and a time of a proper operation in an avoiding direction. Alternatively, in the case of requiring a proper operation time, the evaluation can be made based on a temporal deviation of the actual operation timing from an optimal operation timing. The optimal operation timing can be calculated based on the appearing position of the obstacle character, the present position of the roll-playing character 102 and the speed information from the speed calculating device 403.

Figure 17:
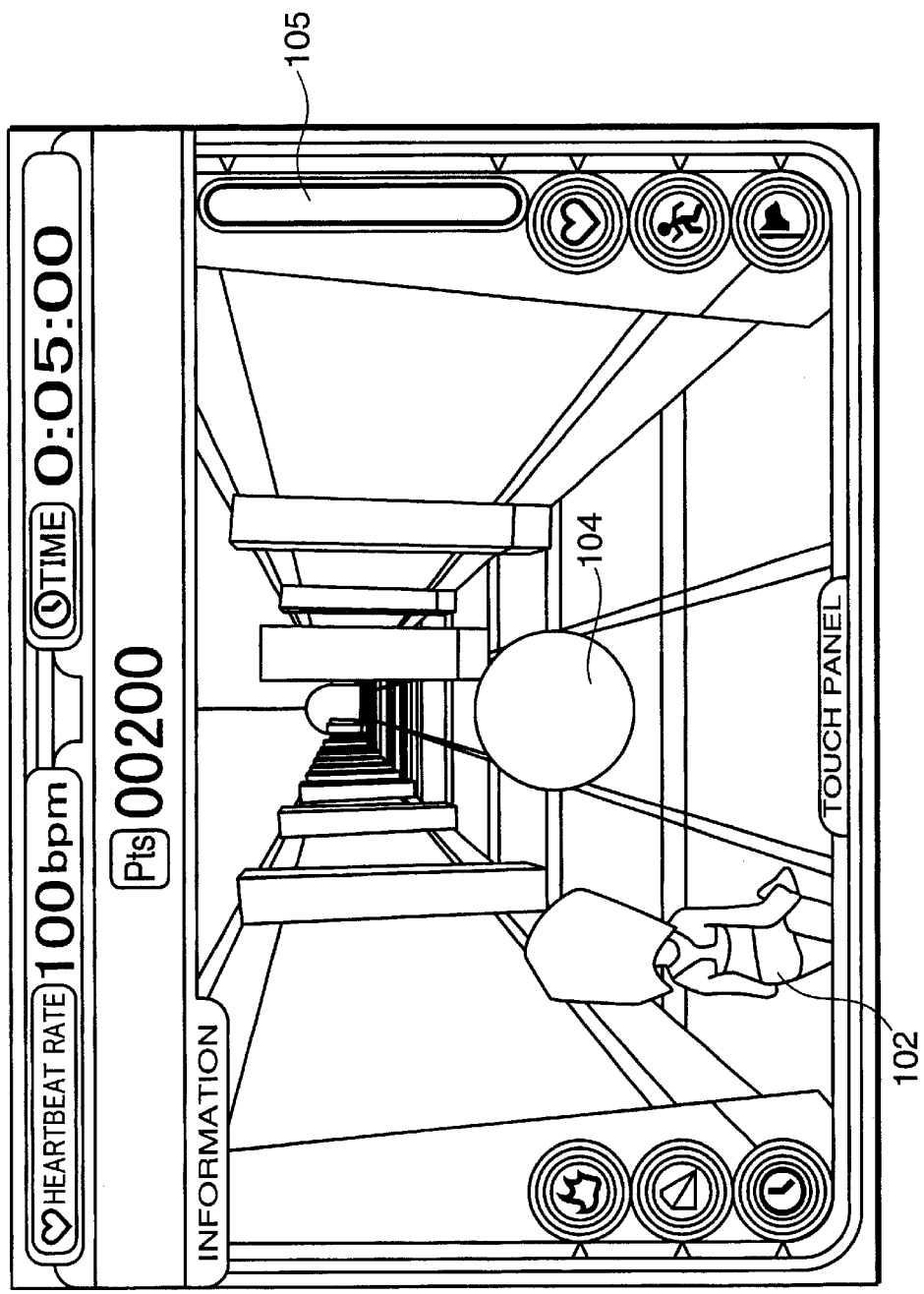
FIG. 17 is a diagram showing a state where a rock character is displayed to appear on the running path and move toward the roll-playing character in a zigzag manner.

FIG. 17 shows a scene where a rock character 104 appears on the running road and moves toward the roll-playing character 102 in a zigzag manner. Although the rock character 104 is located in the middle of the running road in FIG. 17, it is executed to gradually move to the left side and then turn and move to the right side. Thus, the right optical sensor 37 needs to be operated at a suitable timing.

In the case of stationary obstacle characters, they are preferred to suddenly appear in front of the roll-playing character 102. On the other hand, in the case of moving obstacle characters, they are preferably displayed to be already present on the running road. A score may be given depending on whether or not the roll-playing character 102 succeeded in avoiding the obstacle character or the aforementioned time difference or temporal deviation may be converted into a score to be given.

In the case of the trap character and the like that are lifted up from the floor surface, the middle optical sensor 36 may be used to instruct a jump. By doing so, the gaming quality can be improved.

Although the optical sensors which are noncontact sensors are used in this embodiment in order to make it easier for the user doing the running exercise to instruct the change of the direction, ultrasonic sensors or dielectric sensors may be used.

Next, a procedure of the exercise assistance is described with reference to flow charts.

Figure 18:
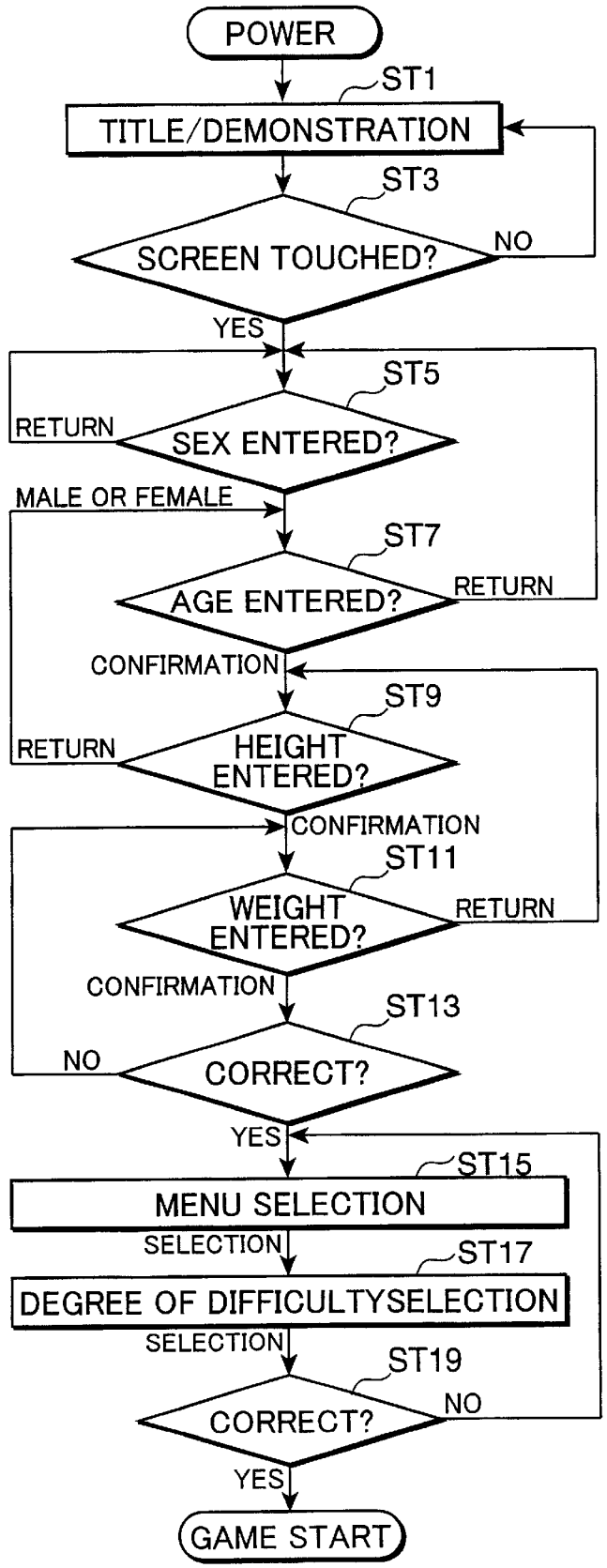
FIG. 18 is a main flow chart showing a main routine.

FIG. 18 is a main flow chart. When the running machine 1 is turned on, a demonstration image is first displayed on the screen of the monitor 31 (Step ST1). Subsequently, the machine 1 waits on standby (NO in Step ST3) until the user touches the touch panel 32 after the individual card is inserted into the card reader 38. When the user touches the touch panel 32, it is judged that the user intends to start the exercise and the screen shown in FIG. 6 is displayed to urge the entries until the entries are made (Step ST5). Upon the completion of the entry of sex (confirmation), the age entry screen shown in FIG. 7 is displayed to urge the entry of age until the age is entered (Step ST7). When "Return" is instructed, it is returned to the entry of sex.

After the age is entered, the entry of height is urged and then the entry of weight is urged (Steps ST9, ST11). Here, the conformation screen shown in FIG. 8 is displayed (Step ST13) and if all the entries are affirmed, the menu selection urging screen, the degree of difficult selection urging screen and the confirmation screen are successively displayed (Steps ST15, ST17, ST19). Then, the game is started.

Figure 19:
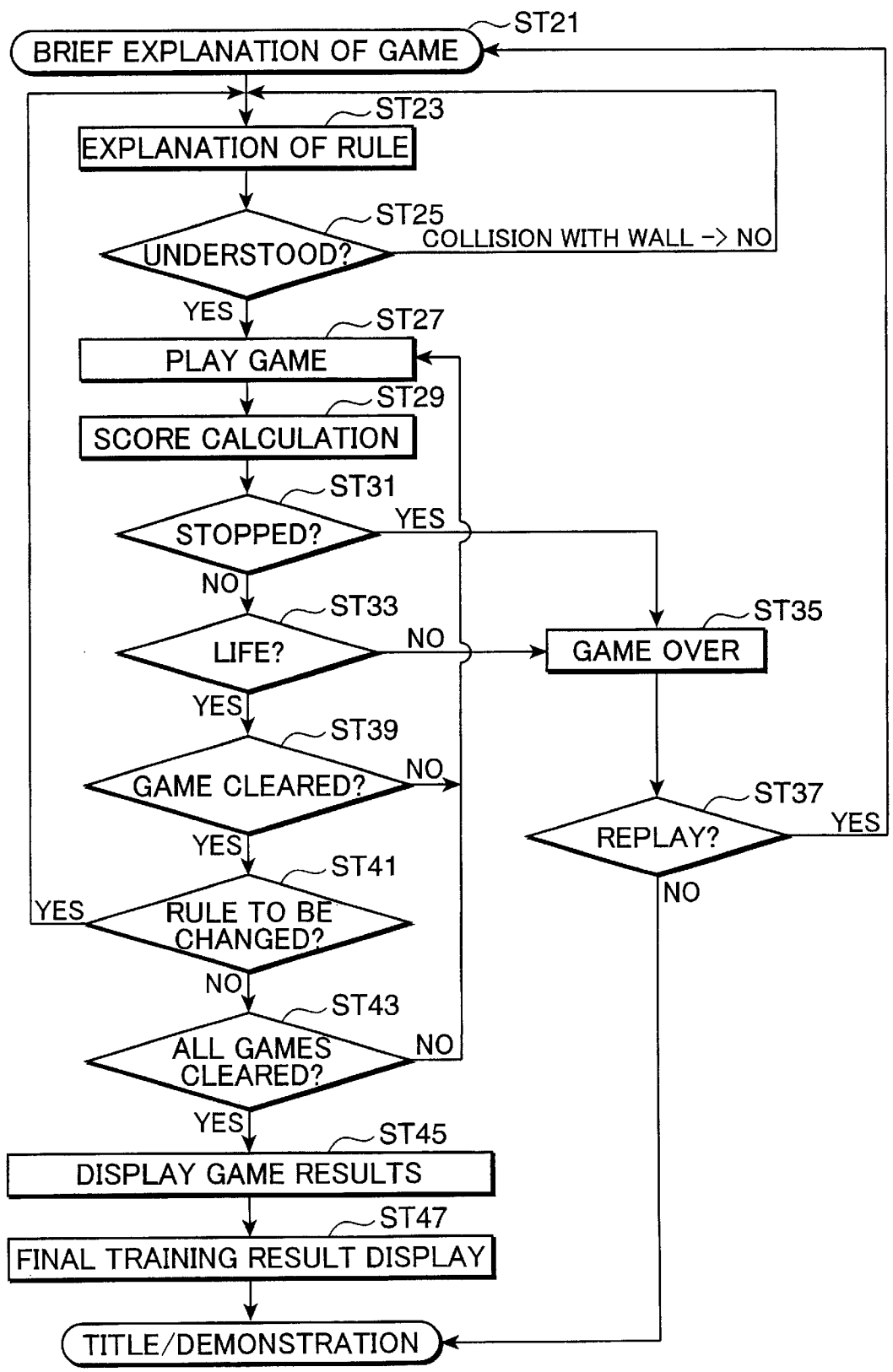
FIG. 19 is a flow chart showing the process of a game.

FIG. 19 is a flow chart showing the process of a game. This flow chart is adapted to make the user understand the game rule prior to the game executed in accordance with the aforementioned specified rule during the running exercise, and the scene shown in FIG. 16 corresponds thereto. First, the explanation of the summary of the game is displayed on the screen of the monitor 31 and then the rule is explained in a similar manner. The game rule is explained in a may conforming to the actual game as shown in FIG. 16, and whether or not the user has mastered how to operate the optical sensors 35 to 37 can be confirmed. In other words, after the explanation of the summary of the game, a screen requiring an answer to a question as to whether or not the user has understood is displayed, for example, in such an on-the-job format that the wall character 103 appears on the running road and the operation to the "right", "middle" or "left" button to avoid it is urged (Steps ST21, ST23). Conformation as to whether the user has understood the operating method is required (Step ST25). Here, based on FIG. 16, if the "left" button is operated (if the user's hand is placed above the left optical sensor 35), the wall character 103 can be avoided and, therefore, the user is judged to have understood (YES in Step ST25). When the wrong button was selected or no operation was made, a similar procedure is repeated upon judging that the user has not yet understood (NO in Step ST25). The optical sensors 35 to 37 start being driven from Step ST23 on in order to save unnecessary emission.

On the other hand, the game can be started in accordance with the specified rule when the user is judged to have understood (Step ST27). Specifically, the obstacle characters shown in FIGS. 15A to 15F appear in front of the roll-playing character 102 and the optical sensors 35 to 37 are operated quickly or at suitable timings in order to avoid these obstacles. Subsequently, the score is calculated based on the operation results (Step ST29). The score may be calculated by adding the time differences for the number of the games played or by averaging the time differences.

Subsequently, it is discriminated whether a stop button, one of the buttons 34, has been pressed and, unless otherwise, discrimination is made as to the presence or absence of a life. The life is displayed in the form of a vertically extending life gauge 105 at a specified position of the running screen: at an upper-right side in this embodiment. This life is set in the "Survival Running" course shown in FIG. 10. Specifically, the user possesses a specified amount of energy (this is referred to as life), a specified amount of the life is consumed when the roll-playing character 102 collides with the obstacle character, whereby a line in the life gauge 105 is shortened by a corresponding distance. The life gauge 105 becomes zero when the energy consumption is repeated to consume all the energy of the life, resulting in the end of the game. Specified items for recovering the life are caused to properly appear during the game, and the life can be recovered by causing the roll-playing character 102 to collide with and obtain these items using the optical sensors 35 to 37. In such a case, the line in the life gauge 105 is extended by a corresponding distance.

Step ST39 follows if there still remains the life. On the other hand, a game-over processing is executed if there is no more life or the stop button is pressed and a screen for receiving an entry concerning whether the user wishes to replay the game comes up. Step ST21 follows if the replay is selected, whereas this routine ends to enter a standby state unless otherwise.

In Step ST39, it is discriminated whether the user has cleared a certain kind of game. If it is judged that he has not cleared, this routine returns to Step ST27 and the same game is repeated. If it is judged that he has cleared, it is discriminated whether the rule is to be changed, i.e. another kind of game is to be played (Step ST41). If there still remains a game of the other rule, this routine returns to Step ST23 and a similar processing is executed. On the other hand, if the rule is not changed and all the games set at the start of the running exercise have not been cleared yet, this routine returns to Step ST27 and a game is executed based on the same rule. If it is judged that all the games have been cleared, a screen displaying the game results comes up and final training results are displayed as shown in FIGS. 13 and 14 (Steps ST45, ST47).

Here, the processing executed for the training itself is described. The pulse monitoring device 401 detects the pulse rate and compares the detected pulse rate with a target pulse rate obtained from the individual data (e.g. weight) of the user and the training selection item. Specifically, it is discriminated whether the detected pulse rate is above, substantially equal to or below the target pulse rate. The jack controlling device 406 outputs a command signal to activate the jack driving device 18 and decrease the inclination (i.e. load condition) of the running belt 14 by a specified amount (e.g. one step set beforehand) if the detected pulse rate is above the target pulse rate; maintains the inclination of the running belt 14 as it is if the detected pulse rate is substantially equal to the target pulse rate; and outputs a command signal to increase the inclination of the running belt 14 by one step if the detected pulse rate is below the target pulse rate. In this way, the load and the exercise are balanced.

On the other hand, if the detected pulse rate exceeds an upper limit value set beforehand as a danger zone, a warning message "Game Suspended" is displayed via the trainer character 101.

The present invention can also be embodied as follows.

(1) An inventive exercise assisting apparatus may comprise:

an exercise machine having a driving unit for causing a user to do a running exercise, a pulse rate detecting means for detecting the pulse rate of the user, an exercise monitoring means for monitoring a running state of the user based on a driven state of the driving unit and the detected pulse rate, a monitor provided at the front side of the exercise machine for displaying images, display controlling means for displaying an image of a virtual space including a running road on the monitor with the position of a virtual camera, which is changed according to the driven state of the driving unit, as a viewpoint, game executing means for displaying obstacle characters to appear on the running road in accordance with a specified rule, direction changing means for receiving an instruction to change a running direction on the displayed running road in response to an operation made by the user doing the running exercise, and game evaluating means for evaluating another athletic ability of the user based on how properly he instructed to change the running direction to avoid virtual collisions with the obstacle characters.

(2) An inventive exercise assistance controlling method for causing a user to do a running exercise using an exercise machine having a driving unit, detecting the pulse rate of the user, and monitoring a running state of the user based on a driven state of the driving unit and the detected pulse rate may comprise the steps of:

displaying an image of a virtual space including a running road on a monitor provided at the front side of the exercise machine to display images with the position of a virtual camera, which is changed according to the driven state of the driving unit, as a viewpoint, displaying obstacle characters to appear on the running road in accordance with a specified rule, receiving an instruction to change a running direction on the displayed running road in response to an operation made by the user doing the running exercise, and evaluating another athletic ability of the user based on how properly he instructed to change the running direction to avoid virtual collisions with the obstacle characters.

According to the above embodiments (1), (2), when the driving unit is driven and the user exercises using the driving unit of the exercise machine, the pulse rate of the user is detected and the exercise monitoring means monitors the exercising state of the user based on the driven state of the driving unit and the detected pulse rate. For example, the exercise monitoring means calculates a consumed calorie, judges whether the user is exercising in a suitable, excessive or light load condition, and notifies the judgment result to the user if necessary. On the other hand, the virtual space including the running road is displayed with a character corresponding to the user as the viewpoint of the virtual camera, and this character keeps running along the running road by operating the direction changing means on the monitor screen. The running road is straight or even if it is curved, the character may automatically run along the running road.

The obstacle characters are displayed to appear on the running road in accordance with the specified rule by the game executing means. The user keeps the character running while avoiding these obstacle characters, i.e. by operating the direction changing means. When a poor operation is made, the character collides with the obstacle character. The game evaluating means evaluates the game based on the skill in avoiding the obstacle characters. This skill can be used to reflect the level of a body function such as reflex and quickness different from the original purpose of the exercise assistance.

(3) Although the machine in which the user runs on the running belt is described in the foregoing embodiment, the present invention is similarly applicable to a cycling machine, a step-type walking machine and various other exercise equipments with which training can be made through the leg exercise. By imaging the leg exercise as a forward movement in the virtual space, the user can be urged to have an active will to do a simple exercise.

(4) Although the obstacle characters are shown and instructions are given to change the moving direction of the virtual camera (substantially the same as the roll-playing character corresponding to the user) in order to avoid the virtual collision with the obstacle characters in the foregoing embodiment, such instructions are not restrictedly given to avoid the collisions according to the present invention. For example, game characters appearing ahead of the moving direction (on the ground, on the floor surface (running movement in these cases), and the roll-playing character may move in the air or in the water) may be hit (assuming mole-hitting games), caught, and torn (like balloons). Similarly based on the skill in instructing the direction change, evaluation is made as to whether or not the aforementioned related operations set beforehand have been suitably performed in the games. Thus, depending on the content of the game, the direction may be changed to up, middle and below instead of being changed to left, middle and right.

(5) Although driving source such as a motor is used as the driving unit in the foregoing embodiment, the driving unit may be man-driven.

In summary, the present invention relates to an exercise assisting apparatus which comprises: an exercise machine having a driving unit for causing a user to do a leg exercise, exercise monitoring means for monitoring a state of the user's leg exercise based on a driven state of the driving unit, a monitor provided at the front side of the exercise machine for displaying images, display controlling means for displaying an image of a virtual space including an advancing road on the monitor with the position of a virtual camera, which is changed according to the driven state of the driving unit, as a viewpoint, game executing means for displaying a game character to appear on the advancing road in accordance with a specified rule, direction changing means for receiving an instruction to change an advancing direction on the displayed advancing road in response to an operation made by the user doing the leg exercise, and game evaluating means for evaluating an athletic ability of the user based on how properly he instructed to change the advancing direction to make a preset related operation against the game character.

In addition, the present invention takes a form of an exercise assistance controlling method for monitoring a state of a leg exercise of a user based on a driven state of a driving unit while casing the user to do the leg exercise using an exercise machine having the driving unit. The inventive method comprises the steps of: displaying an image of a virtual space including an advancing road on a monitor provided at the front side of the exercise machine to display images with the position of a virtual camera, which is changed according to the driven state of the driving unit, as a viewpoint, displaying a game character to appear on the advancing road in accordance with a specified rule, receiving an instruction to change an advancing direction on the displayed advancing road in response to an operation made by the user doing the leg exercise, and evaluating an athletic ability of the user based on how properly he instructed to change the advancing direction to make a preset related operation against the game character.

With these apparatus and method mentioned in the above, when the driving unit of the exercise machine is driven and the user exercises using the driving unit, the exercise monitoring means monitors the exercising state of the user based on the driven state of the driving unit. On the other hand, the virtual space including the advancing road is displayed with a character corresponding to the user as the viewpoint of the virtual camera, and this character keeps moving forward along the advancing road by operating the direction changing means on the monitor screen. The advancing road is straight or even if it is curved, the character may automatically move forward along the running road.

The game character is displayed to appear on the advancing road in accordance with the specified rule by the game executing means. The user operates the direction changing means to make the preset related operation against this game character. For example, in such a mode assuming the game character as an obstacle, the character moves forward while avoiding the obstacle or collides with the game character if a poor operation is made. The game evaluating means evaluates the game based on the skill in instructing the preset related operation against the game character. This skill can be used to improve the level of a body function different from the original purpose of the exercise assistance such as reflex and quickness. In this way, the user can be urged to keep exercising and training for a longer time. In the case that the game executing means is operated, the advancing road used for the exercise may be used as an advancing road for the game or an advancing road separately prepared for the game may be used.

In the aforementioned exercise assisting apparatus, the driving unit of the exercise machine may include an endless running belt mounted between rollers, and a driving source for turning the running belt. With this construction, it is sufficient for the user only to walk or run on the running belt being turned.

Moreover, in the exercise assisting apparatus, the driving unit of the exercise machine may include an inclination changing means for changing the inclination of the running belt. With this construction, an exercise load can be easily changed and adjusted by changing the inclination.

Furthermore, the direction changing means may include a non-contact sensor. It is difficult and uncertain for the user to press a button on the monitor screen due to the vibration of his body while doing the leg exercise or the running exercise. However, by using the non-contact sensor, the game can be securely and safely played since this sensor reacts regardless of a slight distance variation.

Yet moreover, the preset related operation against the game characters may include an operation of avoiding a virtual collision with the game character. With this construction, the advancing or running movement can be better imaged by using the game character as an obstacle, thereby making the game more interesting.

In addition, the aforementioned apparatus may further comprise a position calculating means for calculating a position on the advancing road in the virtual space based on the driven state of the driving unit, wherein the game executing means displays the game character to appear immediately before the viewpoint of the virtual camera using an information on the calculated position. With this construction, since the virtual position of the user on the advancing road in the virtual space is calculated based on the driven state of the driving unit, the game character can be displayed to appear in the virtual space at a suitable timing using the information on the calculated position.

Moreover, it can be configured such that the game executing means displays the game character to appear at random using the information on the calculated position. With this construction, a more precise evaluation can be made on the reflex and the quickness since the game character appears at random, i.e. suddenly.

It also is possible to configure that the game executing means displays the game character to appear at a specified position using the information on the calculated position.) With this construction, the user can have a certain kind of expectation since the game can be always executed at the specified position on the advancing road.

Furthermore, it is also possible to configure that the game executing means displays the game character to appear at specified time intervals using the information on the calculated position. With this construction, a problem of getting bored to the simple running exercise can be solved since the game is executed at preset time intervals.

It also is possible to configure that the game executing means displays the game character beforehand on the advancing road. With this construction, a load on a game executing software can be alleviated to a certain degree. In executing the game, the position of the game character may be changed (may include the change in shape) at random on the advancing road or different game characters may appear, thereby making the game more difficult.

Moreover, it is possible that the game executing means is set to change the position of the game character in at least one of upward, downward, leftward, rightward and advancing directions and a direction opposite from the advancing direction with respect to the advancing road. With this construction, since the game character moves, a timing of operating the direction changing means to do a specified operation in conformity with such a movement is important, and evaluation is made based on the operation timing.

In the aforementioned apparatus, the game evaluating means can be set to make an evaluation based on a time difference between the appearance of the game character and the operation of the direction changing means. With this construction, the quickness and reflex in avoiding the game character suddenly appearing in front can be directly evaluated.

Moreover, the game evaluating means is set to make an evaluation based on a timing at which the direction changing means is operated to avoid the game character. With this construction, particularly in the case that the game character is changing, evaluation can be made based on the operation timing.

Yet moreover, the game executing means is set to cause the game character to appear at a plurality of positions on the advancing road, and the game evaluating means adds and notifies the evaluations on the operations made to the direction changing means against the respective game characters. With this construction, a feedback can be given to the user for self-evaluation by notifying the evaluation of the operation, for example, by displaying it on the monitor. As a way of giving a feedback, the evaluation of the user may be notified in comparison with standards, thereby enabling the user to easily make a relative recognition of his ability in comparison with others. This contributes to urging the user to do the exercise using this apparatus and to an enhanced will to exercise.

This application is based on Japanese patent application serial no. 2001-321952, filed in Japan Patent Office on Oct. 19, 2001, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An exercise assisting apparatus, comprising:
an exercise machine having a driving unit for causing a user to do a leg exercise,
exercise monitoring means for monitoring a state of the user's leg exercise based on a driven state of the driving unit,
a monitor provided at the front side of the exercise machine for displaying images,
display controlling means for displaying an image of a virtual space including an advancing road on the monitor with the position of a virtual camera, which is changed according to the driven state of the driving unit, as a viewpoint, game executing means for displaying a game character to appear on the advancing road in accordance with a specified rule, direction changing means for receiving an instruction to change an advancing direction on the displayed advancing road in response to an operation made by the user doing the leg exercise, and game evaluating means for evaluating an athletic ability of the user based on how properly he instructed to change the advancing direction to make a preset related operation against the game character.

2. An exercise assisting apparatus according to claim 1, wherein the driving unit of the exercise machine includes an endless running belt mounted between rollers, and a driving source for turning the running belt.

3. An exercise assisting apparatus according to claim 2, wherein the driving unit of the exercise machine includes an inclination changing means for changing the inclination of the running belt.

4. An exercise assisting apparatus according to claim 1, wherein the direction changing means includes a non-contact sensor.

5. An exercise assisting apparatus according to claim 1, wherein the preset related operation against the game characters includes an operation of avoiding a virtual collision with the game character.

6. An exercise assisting apparatus according to claim 1, further comprising a position calculating means for calculating a position on the advancing road in the virtual space based on the driven state of the driving unit, wherein the game executing means displays the game character to appear immediately before the viewpoint of the virtual camera using an information on the calculated position.

7. An exercise assisting apparatus according to claim 6, wherein the game executing means displays the game character to appear at random using the information on the calculated position.

8. An exercise assisting apparatus according to claim 6, wherein the game executing means displays the game character to appear at a specified position using the information on the calculated position.

9. An exercise assisting apparatus according to claim 6, wherein the game executing means displays the game character to appear at specified time intervals using the information on the calculated position.

10. An exercise assisting apparatus according to claim 1, wherein the game executing means displays the game character beforehand on the advancing road.

11. An exercise assisting apparatus according to claim 1, wherein the game executing means changes the position of the game character in at least one of upward, downward, leftward, rightward and advancing directions and a direction opposite from the advancing direction with respect to the advancing road.

12. An exercise assisting apparatus according to claim 1, wherein the game evaluating means makes an evaluation based on a time difference between the appearance of the game character and the operation of the direction changing means.

13. An exercise assisting apparatus according to claim 11, wherein the game evaluating means makes an evaluation based on a timing at which the direction changing means is operated to avoid the game character.

14. An exercise assisting apparatus according to claim 1, wherein the game executing means causes the game character to appear at a plurality of positions on the advancing road, and the game evaluating means adds and notifies the evaluations on the operations made to the direction changing means against the respective game characters.

15. An exercise assisting apparatus according to claim 1, wherein said athletic ability includes a reflex of the user.

16. An exercise assisting apparatus according to claim 1, wherein said athletic ability includes a quickness of the movement of the user.

17. An exercise assistance controlling method for monitoring a state of a leg exercise of a user based on a driven state of a driving unit while casing the user to do the leg exercise using an exercise machine having the driving unit, comprising the steps of:

displaying an image of a virtual space including an advancing road on a monitor provided at the front side of the exercise machine to display images with the position of a virtual camera, which is changed according to the driven state of the driving unit, as a viewpoint, displaying a game character to appear on the advancing road in accordance with a specified rule, receiving an instruction to change an advancing direction on the displayed advancing road in response to an operation made by the user doing the leg exercise, and evaluating an athletic ability of the user based on how properly he instructed to change the advancing direction to make a preset related operation against the game character.

* * * * *